United States Patent [19]
Togawa

[11] Patent Number: 5,930,226
[45] Date of Patent: Jul. 27, 1999

[54] STORAGE MEDIUM STORING PLURAL DATA OF PLURAL TYPES IN REPRODUCTION ORDER WITH IDENTIFICATION INFORMATION

[75] Inventor: Yoshifusa Togawa, Kawasaki, Japan

[73] Assignee: Fujitsu Limited, Kawasaki, Japan

[21] Appl. No.: 08/821,730

[22] Filed: Mar. 20, 1997

[30] Foreign Application Priority Data

Jun. 4, 1996 [JP] Japan .................................. 8-141248

[51] Int. Cl.$^6$ ........................................................ G11B 7/24
[52] U.S. Cl. .......................................... 369/275.3; 369/58
[58] Field of Search ..................................... 369/275.3, 58

[56] References Cited

U.S. PATENT DOCUMENTS

| | | | |
|---|---|---|---|
| 5,488,717 | 1/1996 | Gibson et al. | 707/2 |
| 5,561,650 | 10/1996 | Yamagishi | 369/48 |
| 5,596,564 | 1/1997 | Fukushima et al. | 369/275.3 |
| 5,596,565 | 1/1997 | Yonemitsu et al. | 369/275.3 |
| 5,684,768 | 11/1997 | Terasaki et al. | 369/47 |
| 5,765,165 | 6/1998 | Harper | 707/104 |

*Primary Examiner*—John W. Cabeca
*Assistant Examiner*—Felix B. Lee
*Attorney, Agent, or Firm*—Staas & Halsey LLP

[57] ABSTRACT

A recording apparatus generates a plurality of pieces of data to be recorded on a storage medium, and to be reproduced in a plurality of modes of reproduction; generates identification information indicating a reproduction mode; and writes the pieces of data and the identification information in the storage medium so that the pieces of data are written in a sequential order in which to be reproduced. The sequential order is independent of the plurality of reproduction modes. Each piece of data is accompanied by the identification information for that piece of data. A reproducing apparatus reads the pieces of data and the identification information, in the sequential order; detects the identification information which accompanies the respective pieces of data; and reproduces the pieces of data in the corresponding ones of the plurality of reproduction modes based on the accompanying identification information.

26 Claims, 33 Drawing Sheets

Fig.4D

| ID1 | L1 | PT1 | DATA1 | ID2 | L2 | PT2 | DATA2 |

Fig.4E

| ID1 | L1 | DATA1 | PT1 | ID2 | L2 | DATA2 | PT2 |

Fig.4F

| ID1 | DATA1 | $PT1_1$ | ---- | $PT1_n$ | ID2 | DATA2 | $PT2_1$ | ---- | $PT2_n$ |

Fig.4G

| ID1 | L1 | DATA1 | $PT1_1$ | ---- | $PT1_n$ | ID2 | L2 | DATA2 | $PT2_1$ | ---- | $PT2_n$ |

Fig.23

APPEARANCE
FREQUENCY TABLE
                                          22

| WORD | FIRST APPEARANCE POSITION | APPEARANCE FREQUENCY |
|---|---|---|
| a | A 5 | 18 |
| went | A 10 | 12 |
| grandpa | A 9 | 11 |
| grandma | A 2 | 2 |
| long | B 1 | 2 |

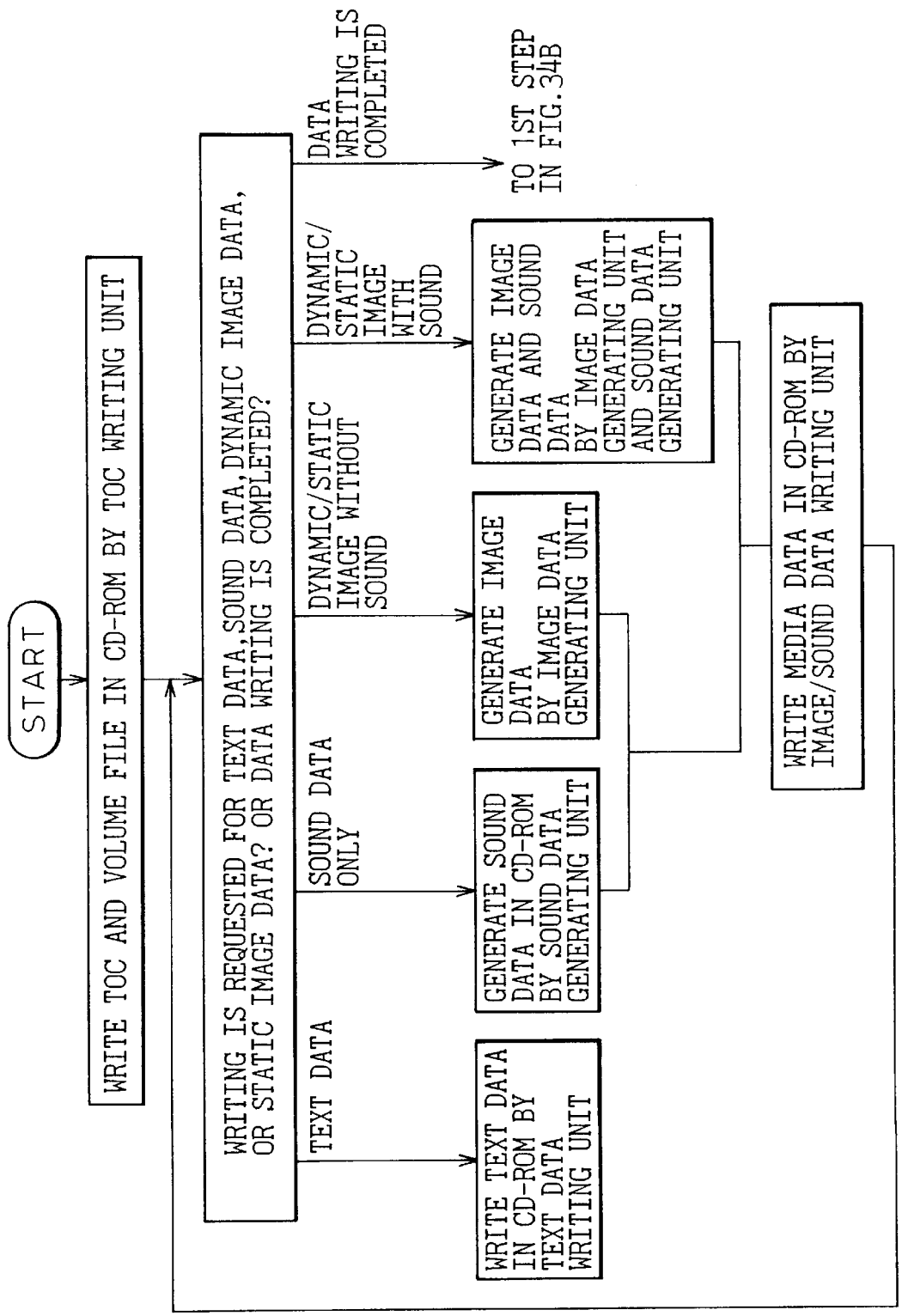

STORAGE MEDIUM STORING PLURAL DATA OF PLURAL TYPES IN REPRODUCTION ORDER WITH IDENTIFICATION INFORMATION

BACKGROUND OF THE INVENTION

1. Field of the Invention

The present invention relates to a storage medium storing a plurality of pieces of data which are to be reproduced in a plurality of ways of reproduction, a recording apparatus for recording in a storage medium a plurality of pieces of data which are to be reproduced in a plurality of ways of reproduction, and a reproducing apparatus for reproducing the plurality of pieces of data which are recorded in the storage medium and to be reproduced in a plurality of ways of reproduction. A typical examples of the storage medium is a data storage disk such as a magnetic disk, a magneto-optic disk, an optical disk (including a CD-ROM, a DVD-ROM, a DVD-RAM, and a DVD-R), and the like, and the present invention can be applied to use with any other storage medium in which information can be stored in a sequential order, and from which information can be read in a sequential order. A typical example of the plurality of pieces of data which are to be reproduced in a plurality of ways of reproduction, is multimedia data. Hereinafter, the word "type" is used to mean "way in which data is to be reproduced". Namely, "data which are to be reproduced in different ways" is expressed as "different types of data" in the following descriptions.

2. Description of the Related Art

Recently, there has been a requirement to store in a storage medium such as a CD-ROM, a plurality of pieces of multimedia data which are to be reproduced in a plurality of ways of reproduction, such as text data, sound data, dynamic (moving) images, static (still) images, and the like. Conventionally, multimedia data which are to be reproduced in a plurality of ways of reproduction, are stored in different regions (tracks) in a storage medium according to the ways of reproduction, respectively. For example, as indicated in FIG. 1, sound data, dynamic image, static image, are respectively stored in different tracks, and information on the assignment of the tracks to the respective types of data is written in the TOC (Table of Contents) area. However, since different types of data are required to be written in different tracks according to the information in the TOC area, in the above conventional technique, the data writing control is complicated. Therefore, failure in writing data often occurs. In addition, according to the above conventional technique, timing control data for synchronization among different types of data must be attached to the respective pieces of data of the different types, it is necessary to provide software for generating and writing the timing control data for synchronization in the storage medium software is also needed for reproducing the data of the different types in synchronization with each other based on the timing control data for synchronization written in the storage medium. Further, according to the above conventional technique, the head of the storage medium driving device must be frequently moved from one track to another for reading different types of data, which are stored in different tracks, based on the information written in the TOC area.

SUMMARY OF THE INVENTION

A first object of the present invention is to provide a storage medium from which a plurality of types of data can be read and reproduced in the time sequential order by a simple operation.

A second object of the present invention is to provide a storage medium which can store in the order of reproduction a plurality of types of data therein, and the plurality of types of data can be distinguished from each other by a reproducing apparatus, without allocating different tracks to different types of data in the storage medium.

A third object of the present invention is to provide a recording apparatus which can record a plurality of types of data in a storage medium, so that the plurality of types of data can be read from the storage medium and reproduced in the time sequential order by a simple operation.

A fourth object of the present invention is to provide a reproducing apparatus which can read in the order of reproduction and reproduce by a simple operation a plurality of types of data stored in a storage medium.

A fifth object of the present invention is to provide a recording apparatus which can record in the order of reproduction a plurality of types of data in a storage medium, so that the plurality of types of data can be distinguished and reproduced, without allocating different tracks to different types of data in the storage medium.

(1) According to the first aspect of the present invention, there is provided a storage medium for storing data thereon. A plurality of pieces of data which are to be reproduced in a plurality of ways of reproduction, are stored in the storage medium in a sequential order in which the plurality of pieces of data are to be reproduced, and the sequential order is independent of the plurality of ways of reproduction in which the plurality of pieces of data are to be reproduced. Each of the plurality of pieces of data stored in the storage medium is accompanied by identification information which indicates one of the plurality of ways of reproduction in which that piece of data is to be reproduced.

(1-1) In the storage medium according to the first aspect of the present invention, a predetermined one of the plurality of ways of reproduction can be indicated by accompanying each of the plurality of pieces of data which is to be reproduced in the predetermined one of the plurality of ways of reproduction with no identification information, instead of specific identification information which indicates the predetermined one of the plurality of ways of reproduction.

(1-2) In the storage medium according to the first aspect of the present invention, at least one of the plurality of pieces of data stored in the storage medium may further be accompanied by pointer information which indicates a location at which a next piece among the plurality of pieces of data, which is to be reproduced next, is stored in the storage medium.

(1-3) In the storage medium according to the above (1-2), the pointer information may indicate, for each of the above at least one of the plurality of pieces of data, a location at which a next piece among the plurality of pieces of data, which is to be reproduced next in the same one of the plurality of ways of reproduction as the above each of the at least one of the plurality of pieces of data, is stored in the storage medium.

(1-4) In the storage medium according to the first aspect of the present invention, each of at least one of the plurality of pieces of data stored in the storage medium may further be accompanied by a plurality of pieces of pointer information which indicate a plurality of locations at which a plurality of candidates for a next piece among the plurality of pieces of data, which is to be reproduced next, are stored in the storage medium, respectively.

(1-5) In the storage medium according to the above (1-4), the plurality of candidates may be pieces of data which are to be reproduced in different ways of reproduction, respectively.

(1-6) In the storage medium according to the first aspect of the present invention, each of at least one of the plurality of pieces of data stored in the storage medium may further be accompanied by data length information which indicates the length of that piece of data.

(2) According to a second aspect of the present invention, there is provided a recording apparatus for recording a plurality of pieces of data in a storage medium. The recording apparatus contains a data generating unit for generating the plurality of pieces of data which are to be recorded on the storage medium, and are then to be reproduced in a plurality of ways of reproduction; an identification information generating unit for generating identification information for each of the plurality of pieces of data, where the identification information generated for each of the plurality of pieces of data indicates one of the plurality of ways of reproduction in which that piece of data is to be reproduced; and a data writing unit for sequentially writing the plurality of pieces of data and the identification information in the storage medium so that the plurality of pieces of data are written in a sequential order in which the plurality of pieces of data are to be reproduced, the sequential order is independent of the plurality of ways of reproduction in which the plurality of pieces of data are to be reproduced, and each of the plurality of pieces of data stored in the storage medium is accompanied by identification information generated for that piece of data.

(2-1) In the recording apparatus according to the second aspect of the present invention, the identification information generating unit may generate no identification information for each of the plurality of pieces of data which is to be reproduced in a predetermined one of the plurality of ways of reproduction, instead of generating specific identification information which indicates the predetermined one of the plurality of ways of reproduction, and the data writing unit may write no identification information with each of the plurality of pieces of data which is to be reproduced in the predetermined one of the plurality of ways of reproduction, instead of writing specific identification information which indicates the predetermined one of the plurality of ways of reproduction.

(2-2) The recording apparatus according to the second aspect of the present invention, may further contain a pointer information generating unit for generating pointer information which indicates, for each of at least one of the plurality of pieces of data, a location at which a next piece among the plurality of pieces of data, which is to be reproduced next, is to be stored in the storage medium; and the data writing unit may further write the pointer information in the storage medium so that each of the above at least one of the plurality of pieces of data stored in the storage medium is further accompanied by the pointer information generated for that piece of data.

(2-3) In the recording apparatus according to the above (2-2), the pointer information may indicate, for each of the above at least one of the plurality of pieces of data, a location at which a next piece among the plurality of pieces of data, which is to be reproduced next in the same one of the plurality of ways of reproduction as the above each of the at least one of the plurality of pieces of data, is to be stored in the storage medium.

(2-4) The recording apparatus according to the second aspect of the present invention, may further contain a pointer information generating unit for generating a plurality of pieces of pointer information which indicate, for each of at least one of the plurality of pieces of data, a plurality of locations at which a plurality of candidates for a next piece among the plurality of pieces of data, which is to be reproduced next, are stored in the storage medium, respectively; and the data writing unit may further write the plurality of pieces of pointer information in the storage medium so that each of the above at least one of the plurality of pieces of data stored in the storage medium is further accompanied by the plurality of pieces of pointer information generated for that piece of data.

(2-5) In the recording apparatus according to the above (2-4), the plurality of candidates may be pieces of data which are to be reproduced in different ways of reproduction, respectively.

(2-6) The recording apparatus according to the second aspect of the present invention, may further contain a data length information generating unit for generating data length information which indicates a length of each of at least one of the plurality of pieces of data; and the data writing unit may further write the data length information in the storage medium so that each of the at least one of the plurality of pieces of data stored in the storage medium is further accompanied by the data length information generated for that piece of data.

(3) According to a third aspect of the present invention, there is provided a reproducing apparatus for reproducing a plurality of pieces of data stored in a storage medium, where the plurality of pieces of data are to be reproduced in a plurality of ways of reproduction, and are stored in the storage medium in a sequential order in which the plurality of pieces of data are to be reproduced. The sequential order is independent of the plurality of ways of reproduction in which the plurality of pieces of data are to be reproduced, and each of the plurality of pieces of data stored in the storage medium is accompanied by identification information which indicates one of the plurality of ways of reproduction in which that piece of data is to be reproduced. The reproducing apparatus contains a data reading unit for reading contents stored in the storage medium in a sequential order; an identification information detecting unit for detecting the identification information which accompanies the respective pieces of data stored in the storage medium; and a reproducing unit for sequentially reproducing the plurality of pieces of data in the corresponding ones of the plurality of ways of reproduction which is indicated by the identification information which accompanies the respective pieces of data stored in the storage medium, and is detected by the identification information detecting unit.

(3-1) In the reproducing apparatus according to the third aspect of the present invention, a predetermined one of the plurality of ways of reproduction can be indicated on the storage medium by accompanying each of the plurality of pieces of data which is to be reproduced in the above predetermined one of the plurality of ways of reproduction with no identification information, instead of specific identification information which indicates the above predetermined one of the plurality of ways of reproduction, and the above reproducing unit may reproduce one of the plurality of pieces of data in the above predetermined one of the plurality of ways of reproduction when the above identification information detecting unit detects no identification information with the above one of the plurality of pieces of data.

(3-2) In the reproducing apparatus according to the third aspect of the present invention, each of at least one of the plurality of pieces of data stored in the storage medium may further be accompanied by pointer information which indicates, for each of the at least one of the plurality of pieces of data, a location at which a next piece among the plurality of pieces of data, which is to be reproduced next, is stored in the storage medium, and the above data reading unit may trace and read at least a portion of the above at least one of the plurality of pieces of data based on the pointer information which accompanies each of the above at least one of the plurality of pieces of data.

(3-3) In the reproducing apparatus according to the above (3-2), the above pointer information may indicate, for each of the above at least one of the plurality of pieces of data, a location at which a next piece among the plurality of pieces of data, which is to be reproduced next in the same one of the plurality of ways of reproduction as the above each of the at least one of the plurality of pieces of data, is stored in the storage medium.

(3-4) In the reproducing apparatus according to the third aspect of the present invention, each of at least one of the plurality of pieces of data stored in the storage medium may further be accompanied by a plurality of pieces of pointer information which indicate, for each of the above at least one of the plurality of pieces of data, a plurality of locations at which a plurality of candidates for a next piece among the plurality of pieces of data, which is to be reproduced next, are stored in the storage medium, respectively, and the above data reading unit may trace and read at least a portion of the above at least one of the plurality of pieces of data based on a selected one of the plurality of pieces of pointer information which accompany each of the above at least one of the plurality of pieces of data.

(3-5) The reproducing apparatus according to the above (3-4), may further contain a pointer information selection control unit for selecting, as the above selected one of the plurality of pieces of pointer information, one of the plurality of pieces of pointer information which accompany each of the above at least one of the plurality of pieces of data, based on a selection rule.

(3-6) The reproducing apparatus according to the above (3-5), may further contain a pointer information selection rule designating unit for inputting a designation input which designates the above selection rule.

(3-7) In the reproducing apparatus according to the above (3-5), the above selection rule may be to select, as the above selected one, one of the plurality of pieces of pointer information which accompany each of the above at least one of the plurality of pieces of data, which one is read first.

(3-8) In the reproducing apparatus according to the above (3-5), the above selection rule may be to select, as the above selected one, one of the plurality of pieces of pointer information which accompany each of the above at least one of the plurality of pieces of data, which one indicates the nearest location.

(3-9) In the reproducing apparatus according to the above (3-4), the plurality of candidates may be pieces of data which are to be reproduced in different ways of reproduction, respectively.

(3-10) In the reproducing apparatus according to the third aspect of the present invention, the above reproducing unit may contain a plurality of sub-reproduction units, provided corresponding to the plurality of ways of reproduction, each for reproducing the plurality of pieces of data when the above identification information which accompanies each piece of data, indicates that that piece of data is to be reproduced in one of the plurality of ways of reproduction corresponding to the above each of the plurality of sub-reproduction units; and a reproduction controlling unit for receiving the identification information detected by the identification information detecting unit, and instructing one of the plurality of sub-reproduction units corresponding to one of the plurality of ways of reproduction which the above identification information indicates, to reproduce one of the plurality of pieces of data which is accompanied by the identification information.

(3-11) In the reproducing apparatus according to the above (3-10), the above reproducing unit may contain a way-of-reproduction designating unit for inputting an instruction to reproduce only a portion of the plurality of pieces of data, where the identification information which accompanies at least one of the plurality of pieces of data included in the above portion, indicates that the above at least one of the plurality of pieces of data included in the above portion are to be reproduced in one or more of the plurality of ways of reproduction; and the above reproduction controlling unit may further receive the above instruction, and instruct one or more of the plurality of sub-reproduction units corresponding to the above one or more of the plurality of ways of reproduction, to reproduce the above at least one of the plurality of pieces of data included in the above portion.

(3-12) In the reproducing apparatus according to the third aspect of the present invention, each of at least one of the plurality of pieces of data stored in the storage medium may further be accompanied by data length information which indicates a length of that piece of data; the above data reading unit may further read the data length information which accompanies the plurality of pieces of data; and the above reproducing unit may reproduce the plurality of pieces of data by using the above data length information.

(4) According to a fourth aspect of the present invention, there is provided a reproducing apparatus for reproducing a plurality of pieces of data stored in a storage medium, where the plurality of pieces of data are to be reproduced in a plurality of ways of reproduction, and are stored in the storage medium in a sequential order in which the plurality of pieces of data are to be reproduced, the above sequential order is independent of the plurality of ways of reproduction in which the plurality of pieces of data are to be reproduced, and each of the plurality of pieces of data stored in the storage medium is accompanied by identification information which indicates one of the plurality of ways of reproduction in which that piece of data is to be reproduced. The above reproducing apparatus contains a way-of-reproduction designating unit for inputting designation information which designates one or more of the plurality of ways of reproduction, for reproducing only a portion of the plurality of pieces of data where each piece in the portion is to be reproduced in the one or more of the plurality of ways of reproduction; a data reading unit for reading each of the plurality of pieces of data only when the identification information accompanying the piece of data indicates the one or more of the plurality of ways of reproduction; and a reproducing unit for reproducing the data read by the data reading unit.

(4-1) In the reproducing apparatus according to the fourth aspect of the present invention, a predetermined one of the plurality of ways of reproduction can be indicated on the storage medium by accompanying no identification information with each of the plurality of pieces of data which is to be reproduced in the predetermined one of the plurality of ways of reproduction, instead of accompanying specific identification information which indicates the predetermined one of the plurality of ways of reproduction. When the above designation information designates the predetermined one of the plurality of ways of reproduction, the data reading unit may read each of the plurality of pieces of data only when no identification information accompanies the piece of data.

(4-2) In the reproducing apparatus according to the fourth aspect of the present invention, each of at least one of the plurality of pieces of data stored in the storage medium may further be accompanied by data length information which indicates a length of that piece of data; the above data reading unit may further read the data length information which accompanies the above portion of the plurality of pieces of data; and the above reproducing unit may reproduce the above portion of the plurality of pieces of data by using the above data length information.

(4-3) In the reproducing apparatus according to the fourth aspect of the present invention, each of at least one of the plurality of pieces of data stored in the storage medium may further be accompanied by pointer information which indicates, for each of the above at least one of the plurality of pieces of data, a location at which a next piece among the plurality of pieces of data, which is to be reproduced next, is stored in the storage medium, and the above data reading unit may trace and read at least a portion of the above at least one of the plurality of pieces of data based on the pointer information which accompanies each of the above at least one of the plurality of pieces of data.

(4-4) In the reproducing apparatus according to the above (4-3), the above pointer information may indicate, for each of the above at least one of the plurality of pieces of data, a location at which a next piece among the plurality of pieces of data, which is to be reproduced next in the same one of the plurality of ways of reproduction as the above each of the at least one of the plurality of pieces of data, is stored in the storage medium.

BRIEF DESCRIPTION OF THE DRAWINGS

In the drawings:

FIG. 4D is a diagram illustrating the manner of storing in a storage medium a plurality of pieces of data which are to be reproduced in a plurality of ways of reproduction, according to a fourth variation of the first aspect of the present invention;

FIG. 4E is a diagram illustrating the manner of storing in a storage medium a plurality of pieces of data which are to be reproduced in a plurality of ways of reproduction, according to a fifth variation of the first aspect of the present invention;

FIG. 4F is a diagram illustrating the manner of storing in a storage medium a plurality of pieces of data which are to be reproduced in a plurality of ways of reproduction, according to a sixth variation of the first aspect of the present invention;

FIG. 4G is a diagram illustrating the manner of storing in a storage medium a plurality of pieces of data which are to be reproduced in a plurality of ways of reproduction, according to a seventh variation of the first aspect of the present invention;

FIG. 23 is a diagram illustrating an example of the appearance frequency table;

FIGS. 34A and 34B are diagrams illustrating the outline of an example operation of the multimedia data recording apparatus of FIG. 26;

DESCRIPTION OF THE PREFERRED EMBODIMENTS

Hereinafter, embodiments of the various aspects of the present invention are explained with reference to the related drawings. Although the explanations are provided for only typical examples, realization of the various aspects and the variations of the present invention as described in the "SUMMARY OF THE INVENTION" of this specification, will be easy for persons skilled in the art, based on the explanations of the following embodiments. In addition, all of the disclosures in the Japanese patent applications, Nos. 7-31977 and 8-141248, and the copending U.S. patent application Ser. No. 8/604605, are incorporated into this specification by reference. Further, in all of the constructions disclosed below, the logical features of the respective units may be realized in either hardware logic circuitry, software, or any combination thereof. A portion or all of such software may be developed on a memory, or stored in a storage medium such as a CD-ROM, a floppy disk, a read-only memory (ROM), a DVD-ROM, a memory card, and the like.

Basic Construction of First Aspect of Present Invention (FIGS. 2, 3, 4A, 4B, 4C, 4D, 4E, 4F, and 4G)

Figure 2:
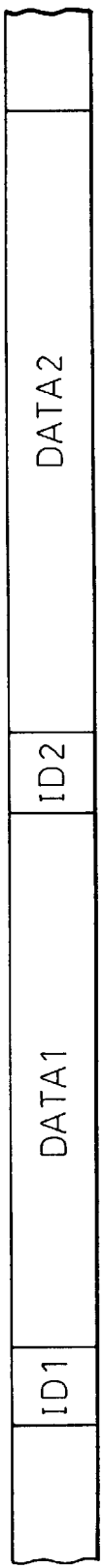
FIG. 2 is a diagram illustrating the manner of storing in a storage medium a plurality of pieces of data which are to be reproduced in a plurality of ways of reproduction, according to the first aspect of the present invention.

FIG. 2 is a diagram illustrating a manner of storing in a storage medium a plurality of pieces of data which are to be reproduced in a plurality of ways of reproduction, according to a first aspect of the present invention. The storage medium is, for example, a magnetic tape, a data storage disk such as a magnetic disk, a magneto-optic disk, an optical disk (including a CD-ROM, a DVD-ROM, a DVD-RAM, and a DVD-R), and any other storage medium in which information can be stored in a sequential order, and from which information can be read in a sequential order. The information indicated in FIG. 2 is assumed to be able to be written and read sequentially from the left to the right. Hereinafter, the same references appeared in different figures denote the same constituents, or pieces of information or data, respectively.

Figure 1:
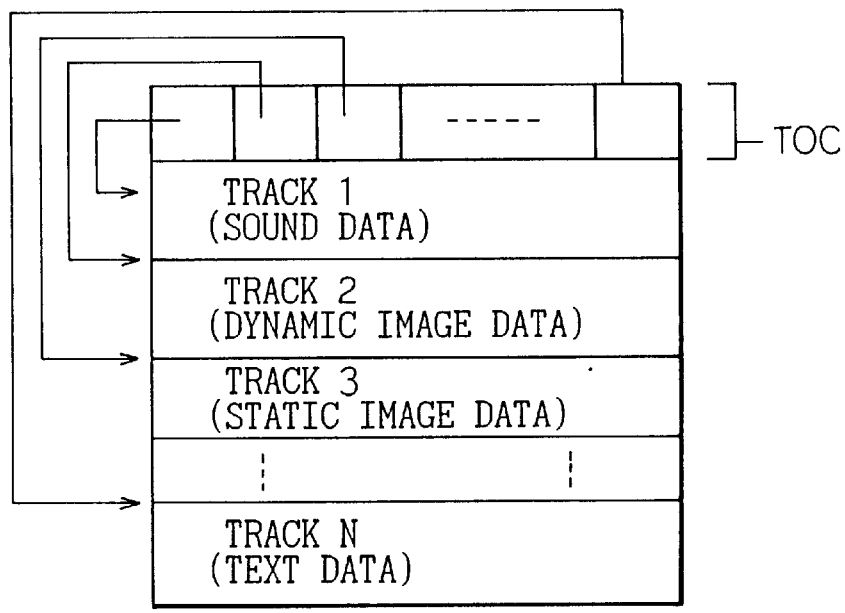
FIG. 1 is a diagram illustrating an example of a conventional manner of storing multimedia data in a storage medium.
Figure 3:
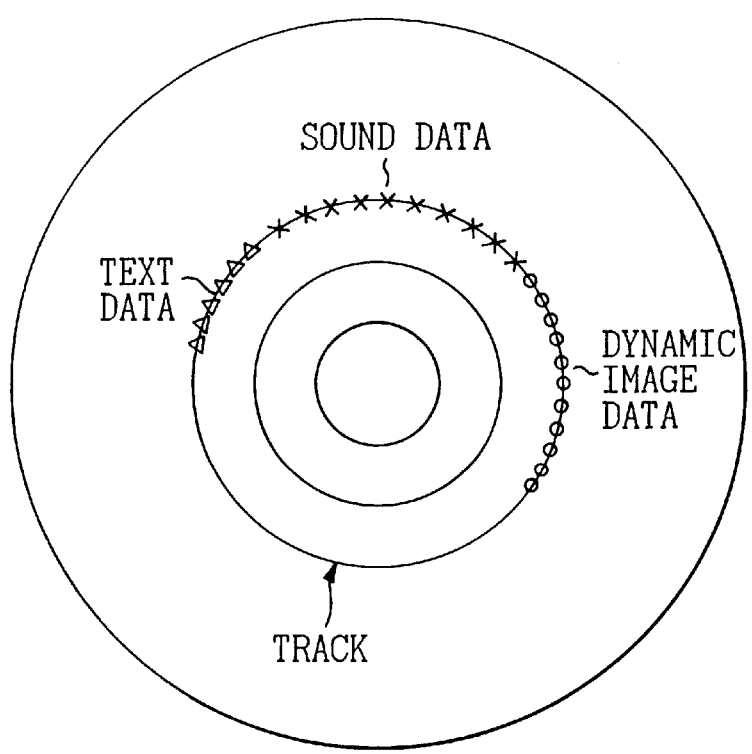
FIG. 3 is an explanatory diagram illustrating example locations where a plurality of pieces of data which are to be reproduced in a plurality of ways of reproduction, are stored in a storage medium, according to the present invention.

In FIG. 2, references DATA1 and DATA2 denote pieces of data which are to be reproduced in a plurality of ways of reproduction, ID1 denotes identification information which indicates the way of reproduction in which the piece of data DATA1 is to be reproduced, and ID2 denotes identification information which indicates the way of reproduction in which the piece of data DATA2 is to be reproduced. The pieces of data DATA1 and DATA2 are written in a sequential order in which these pieces of data are to be reproduced, and the corresponding pieces of identification information ID1 and ID2 accompany these pieces of data DATA1 and DATA2, respectively. When the storage medium is a data storage disk storing multimedia data, individual pieces of the multimedia data are recorded on the data storage disk, for example, as indicated in FIG. 3.

In the case wherein the plurality of pieces of data DATA1 and DATA2 stored in the storage medium are to be reproduced in a plurality of ways of reproduction, the ways of reproduction for the respective pieces of data DATA1 and DATA2 can be recognized by a reproducing apparatus based on the corresponding identification information ID1 and ID2, respectively, and the identification information ID1 and ID2 can be read together with a plurality of pieces of data DATA1 and DATA2, respectively, by a sequential reading operation from the storage medium without jumping across tracks.

Therefore, from the storage medium according to the first aspect of the present invention, a plurality of types of data can be read and reproduced in the time sequential order by a simple operation since the plurality of types of data are written in the storage medium in the time sequential order in which the data are to be reproduced. In addition, when reading and reproducing information from the storage medium according to the first aspect of the present invention, the plurality of types of data can be distinguished and reproduced, without allocating different tracks to different types of data, since each piece of data is accompanied by a corresponding piece of identification information.

In the storage medium according to the first aspect of the present invention, a predetermined one of the plurality of ways of reproduction can be indicated by accompanying each of the plurality of pieces of data which is to be reproduced in the predetermined one of the plurality of ways of reproduction with no identification information, instead of accompanying the data with specific identification information which indicates the predetermined one of the plurality of ways of reproduction. Namely, "no identification information" can be used as one of the identification information.

Figure 4A:
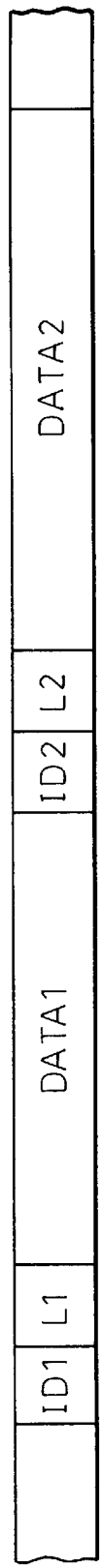
FIG. 4A is a diagram illustrating the manner of storing in a storage medium a plurality of pieces of data which are to be reproduced in a plurality of ways of reproduction, according to a first variation of the first aspect of the present invention.

FIG. 4A is a diagram illustrating the manner of storing in a storage medium a plurality of pieces of data which are to be reproduced in a plurality of ways of reproduction, according to a first variation of the first aspect of the present invention. In the first variation indicated in FIG. 4A, each of at least one of the plurality of pieces of data DATA1 and DATA2 stored in the storage medium is accompanied by a piece of data length information L1 and L2, respectively, in addition to the identification information of FIG. 2. Each piece of data length information indicates a length of the piece of data accompanied by the respective piece of data length information. The data length information is often useful in data processing (for example, separating respective piece of data) in a reproducing apparatus which reads and processes the data stored in the storage medium to reproduce the data.

Figure 4B:
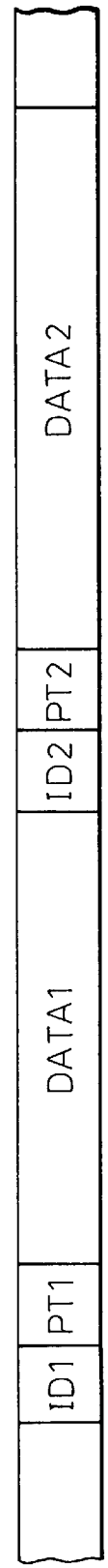
FIG. 4B is a diagram illustrating the manner of storing in a storage medium a plurality of pieces of data which are to be reproduced in a plurality of ways of reproduction, according to a second variation of the first aspect of the present invention.

FIG. 4B is a diagram illustrating the manner of storing in a storage medium a plurality of pieces of data which are to be reproduced in a plurality of ways of reproduction, according to a second variation of the first aspect of the present invention. In the second variation indicated in FIG. 4A, each of at least one of the plurality of pieces of data DATA1 and DATA2 stored in the storage medium is accompanied by pieces of pointer information PT1 and PT2, respectively, in addition to the identification information of FIG. 2. Each piece of pointer information indicates a location at which a next piece among the plurality of pieces of data, which is to be reproduced next, is stored in the storage medium.

Figure 4C:
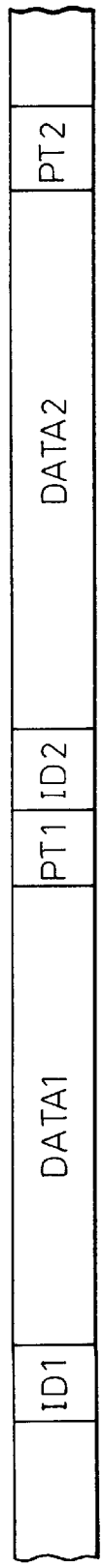
FIG. 4C is a diagram illustrating the manner of storing in a storage medium a plurality of pieces of data which are to be reproduced in a plurality of ways of reproduction, according to a third variation of the first aspect of the present invention.

FIG. 4C is a diagram illustrating the manner of storing in a storage medium a plurality of pieces of data which are to be reproduced in a plurality of ways of reproduction, according to a third variation of the first aspect of the present invention. In the third variation indicated in FIG. 4C, each of at least one of the plurality of pieces of data DATA1 and DATA2 stored in the storage medium is followed by the corresponding piece of pointer information PT1 or PT2. All of the other portions in the manner of storing a plurality of types of data are the same as those of the second variation as indicated in FIG. 4B.

FIG. 4D is a diagram illustrating the manner of storing in a storage medium a plurality of pieces of data which are to be reproduced in a plurality of ways of reproduction, according to a fourth variation of the first aspect of the present invention. In the fourth variation indicated in FIG. 4D, each of at least one of the plurality of pieces of data DATA1 and DATA2 stored in the storage medium is accompanied by both the pieces of pointer information PT1 and PT2 and the pieces of data length information L1 and L2, respectively, in addition to the identification information of FIG. 2.

FIG. 4E is a diagram illustrating the manner of storing in a storage medium a plurality of pieces of data which are to be reproduced in a plurality of ways of reproduction, according to a fifth variation of the first aspect of the present invention. In the fifth variation indicated in FIG. 4E, each of at least one of the plurality of pieces of data DATA1 and DATA2 stored in the storage medium is followed by the corresponding piece of pointer information PT1 or PT2. All of the other portions in the manner of storing a plurality of types of data are the same as those of the fourth variation as indicated in FIG. 4D.

In the pieces of storage medium of FIGS. 4B to 4D, the pointer information may indicate, for each of at least one of the plurality of pieces of data, a location at which a next piece among the plurality of pieces of data, which is to be reproduced next in the same one of the plurality of ways of reproduction as the above each piece of data, is stored in the storage medium.

FIG. 4F is a diagram illustrating the manner of storing in a storage medium a plurality of pieces of data which are to be reproduced in a plurality of ways of reproduction, according to a sixth variation of the first aspect of the present invention. In the sixth variation indicated in FIG. 4F, in addition to the above identification information, each of at least one of the plurality of pieces of data stored in the storage medium may be accompanied by a plurality of pieces of pointer information each of which indicate a plurality of locations at which a plurality of candidates for a next piece among the plurality of pieces of data, which is to be reproduced next, are stored in the storage medium. In this case, the plurality of candidates may be a portion of the above plurality (all) of pieces of data, which are to be reproduced in different ways of reproduction, respectively.

FIG. 4G is a diagram illustrating the manner of storing in a storage medium a plurality of pieces of data which are to be reproduced in a plurality of ways of reproduction, according to a seventh variation of the first aspect of the present invention. In the seventh variation indicated in FIG. 4G, each of at least one of the plurality of pieces of data DATA1 and DATA2 stored in the storage medium is further accompanied by the corresponding piece of data length information L1 or L2. All of the other portions in the manner of storing a plurality of types of data are the same as those of the second variation as indicated in FIG. 4F.

As explained later, various modes of reproduction of the data stored in the storage medium can be realized by use of the pointer information.

Further, although in the examples of FIGS. 2, 4A, 4B, 4C, 4D, 4E, 4F, and 4G, the above pieces of identification information and/or data length information precede or follow the corresponding piece of data, the identification information, the data length information, and the above pointer information may be located in any position relative to the corresponding piece of data as long as these pieces of information accompany the corresponding piece of data. However, preferably, the respective piece of identification information may precede the corresponding piece of data, so that the reproducing apparatus can read first a piece of identification information and recognize the type of a piece of data corresponding to the piece of identification information at an early time.

Figure 5:
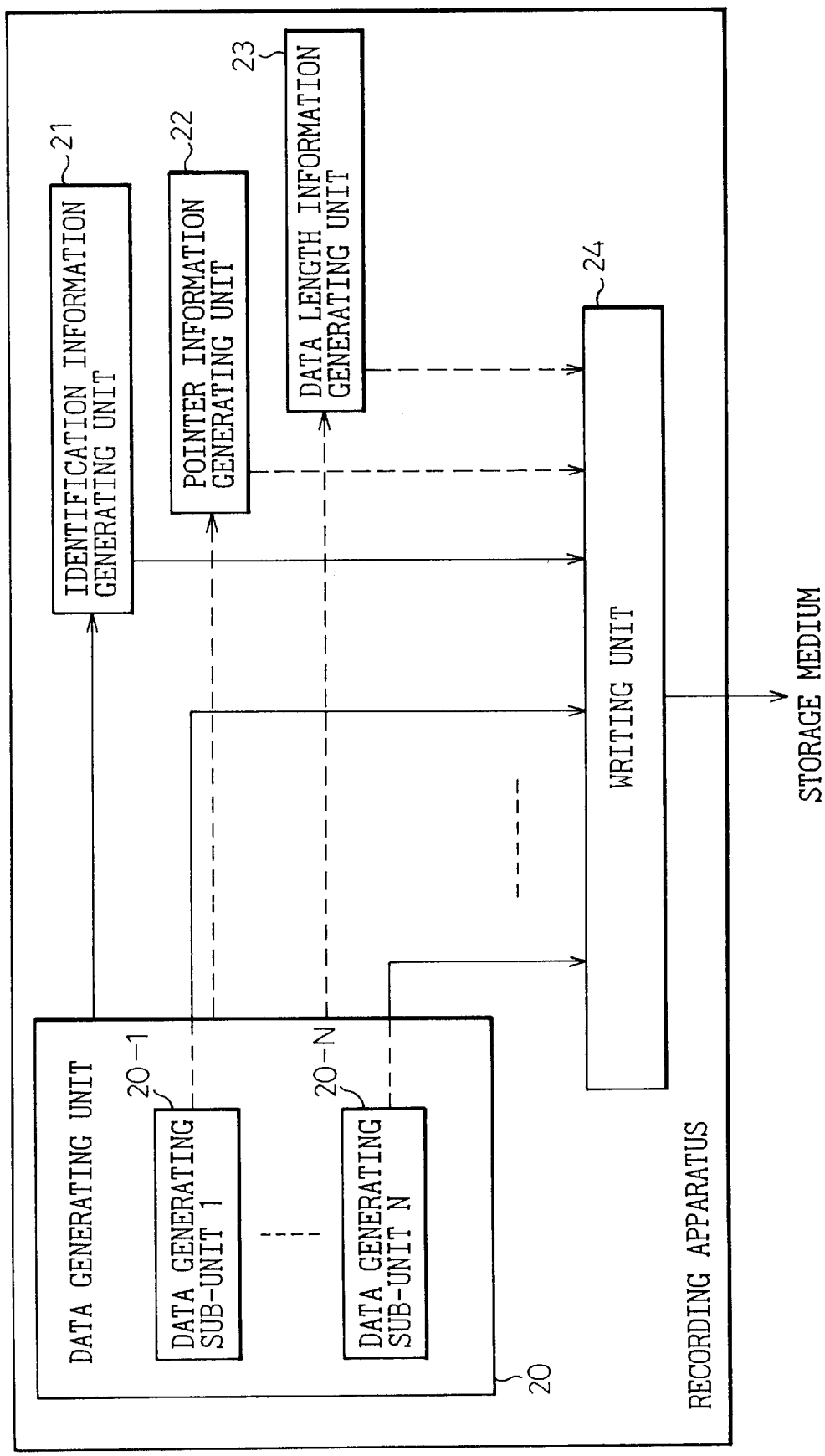
FIG. 5 is a diagram illustrating the basic construction of a recording apparatus according to the second aspect of the present invention.

Basic Construction of Second Aspect of Present Invention (FIG. 5)

FIG. 5 is a diagram illustrating the basic construction of a recording apparatus according to the second aspect of the present invention. The recording apparatus of FIG. 5 is provided for recording a plurality of pieces of data in a storage medium. In FIG. 5, reference number 20 denotes a data generating unit, 21 denotes an identification information generating unit, and 24 denotes a writing unit. The basic construction of the recording apparatus according to the second aspect of the present invention is constituted by these three elements. The data generating unit 20 generates the plurality of pieces of data which are to be recorded on the storage medium, and are then to be reproduced in a plurality of ways of reproduction. As indicated in FIG. 5, the data generating unit 20 may be comprised of a plurality of sub-units 20-1 . . . 20-N respectively provided for generating pieces of data to be reproduced in a plurality of ways of reproduction. The data may be supplied from outside the recording apparatus of FIG. 5. The identification information generating unit 21 generates the identification information for each of the plurality of pieces of data. The identification information is that explained with reference to FIG. 2. The data writing unit 24 sequentially writes the plurality of pieces of data and the identification information in the storage medium so that the plurality of pieces of data are written in a sequential order in which the plurality of pieces of data are to be reproduced, the sequential order is independent of the plurality of ways of reproduction in which the plurality of pieces of data are to be reproduced, and each of the plurality of pieces of data stored in the storage medium is accompanied by identification information generated for that piece of data, for example, as indicated in FIG. 2.

In addition, as indicated in FIG. 5, the data length information generating unit 23 may be added to the above basic construction of the recording apparatus according to the second aspect of the present invention. The data length information generating unit 23 generates the data length information as explained with reference to FIGS. 4A, 4D, 4E, and 4G. In this case, the data writing unit 24 further writes the data length information in the storage medium so that each of the at least one of the plurality of pieces of data stored in the storage medium is further accompanied by the data length information generated for that piece of data, for example, as indicated in FIGS. 4A, 4D, 4E, and 4G.

Further, as indicated in FIG. 5, the pointer information generating unit 22 may be added to the above basic construction of the recording apparatus according to the second aspect of the present invention. The pointer information generating unit 22 generates the pointer information as explained with reference to FIGS. 4B, 4C, 4D, 4E, 4F, and 4G. In this case, the data writing unit 24 further writes the pointer information in the storage medium so that each of the above at least one of the plurality of pieces of data stored in the storage medium is further accompanied by the pointer information generated for that piece of data, for example, as indicated in FIGS. 4B, 4C, 4D, 4E, 4F, and 4G.

The pointer information may be provided in the various ways as explained with reference to FIGS. 4B, 4C, 4D, 4E, 4F, and 4G for the pieces of storage medium. Further, the pointer information may indicate a location of another piece of data to be reproduced next in the same way of reproduction, a plurality of pieces of pointer information may accompany each of at least one of the plurality of pieces of data, and the plurality of pieces of pointer information accompanying each piece of data may correspond to different ways of reproduction. In these cases, the data writing unit 24 and the pointer information generating unit 22 function to generate and write the information and data in the storage medium as explained with reference to FIGS. 4B, 4C, 4D, 4E, 4F, and 4G, respectively.

In the case wherein "no identification information" is used as one of the identification information as explained for the storage medium, the data writing unit 24 writes no identification information with each of the plurality of pieces of data which is to be reproduced in the predetermined one of the plurality of ways of reproduction, instead of writing specific identification information which indicates the predetermined one of the plurality of ways of reproduction.

Figure 6:
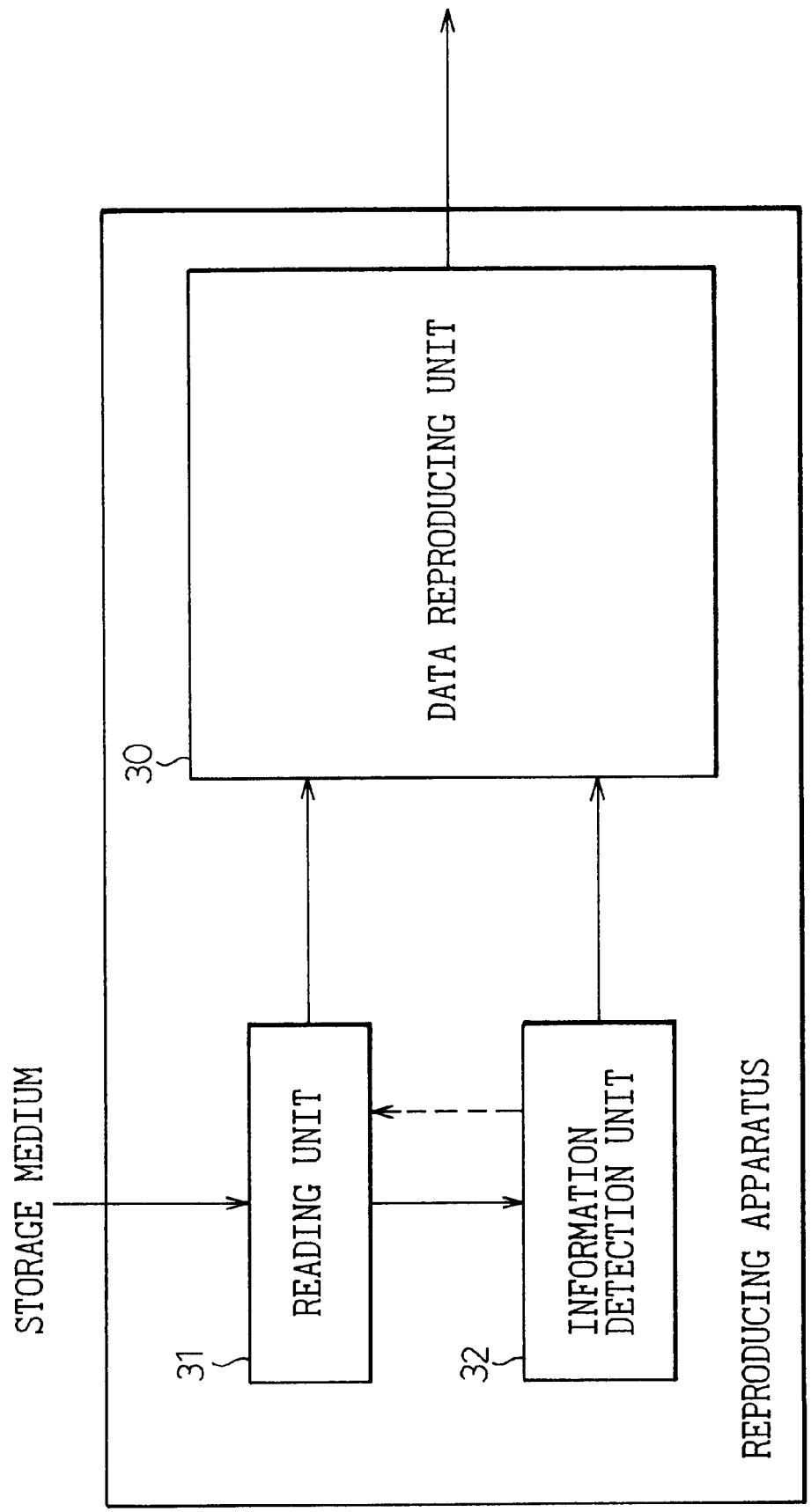
FIG. 6 is a diagram illustrating the basic construction of a reproducing apparatus according to the third aspect of the present invention.
Figure 7:
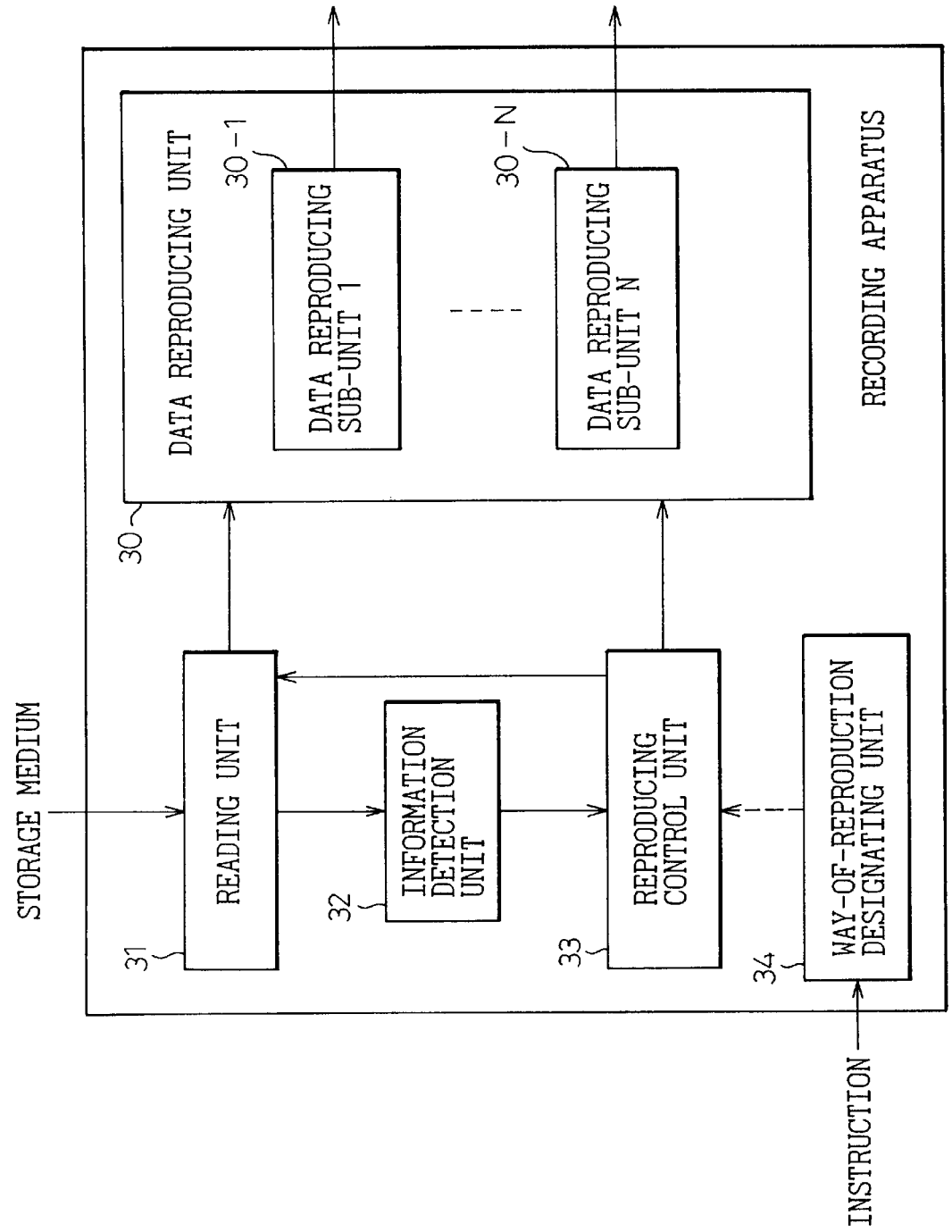
FIG. 7 illustrates additional elements which may be added to the construction of FIG. 6 for realizing three possible variations of the basic construction of FIG. 6.
Figure 8:
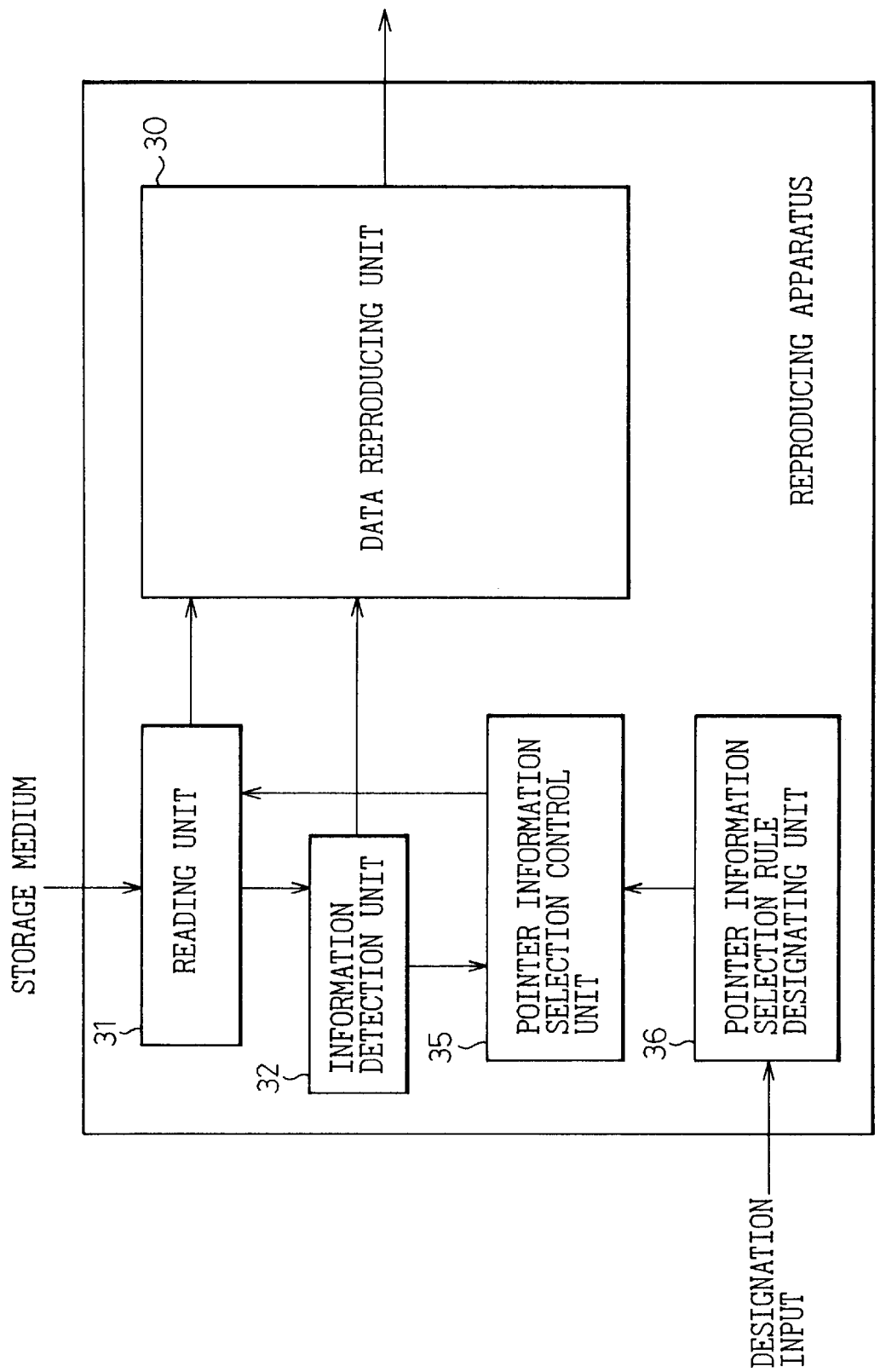
FIG. 8 is a diagram illustrating the basic construction of a reproducing apparatus according to the fourth aspect of the present invention.

Basic Constructions of Third and Fourth Aspects of Present Invention (FIGS. 6, 7, and 8)

FIG. 6 is a diagram illustrating the basic construction of a reproducing apparatus according to the third aspect of the present invention. The reproducing apparatus of FIG. 6 is provided for reading and reproducing a plurality of pieces of data stored in a storage medium, where the storage medium is assumed to be such that explained with reference to FIG. 2. In FIG. 6, reference number 30 denotes a data reproducing unit, 31 denotes a reading unit, and 32 denotes an identification information detecting unit. The basic construction of the recording apparatus according to the second aspect of the present invention is constituted by these three elements. The reading unit 31 reads contents stored in the storage medium in a sequential order. The identification information detecting unit 32 detects the identification information which accompanies the respective pieces of data stored in the storage medium. The data reproducing unit 30 sequentially reproduces the plurality of pieces of data in the corresponding ones of the plurality of ways of reproduction which is indicated by the identification information which accompanies the respective pieces of data stored in the storage medium, and is detected by the identification information detecting unit 31.

FIG. 7 illustrates additional elements which may be added to the construction of FIG. 6 for realizing three possible variations of the basic construction of FIG. 6. In FIG. 7, reference numerals 30-1 . . . 30-N each denote a data reproducing sub-unit, and 33 denotes a reproduction control unit.

In a first variation, the data reproducing unit 30 may be comprised of the plurality of sub-units 30-1 . . . 30-N respectively provided for reproducing pieces of data to be reproduced in a plurality of ways of reproduction, as indicated in FIG. 7.

In a second variation, the reproduction control unit 33 may be added to the above basic construction of the reproducing apparatus, as indicated in FIG. 7. The reproduction control unit 33 receives the identification information detected by the identification information detecting unit 32, and controls the data reproducing unit 30 to reproduce one of the plurality of pieces of data which is accompanied by the identification information in one of the plurality of ways of reproduction which the identification information indicates. For example, the reproduction control unit 33 controls one of the plurality of sub-reproduction units corresponding to one of the plurality of ways of reproduction which the identification information indicates, to reproduce the above one of the plurality of pieces of data which is accompanied by the identification information.

In a third variation, the reproducing apparatus may further contain a way-of-reproduction designating unit 34 for inputting an instruction to reproduce only a portion of the plurality of pieces of data which are to be reproduced in one or more of the plurality of ways of reproduction, as indicated in FIG. 7. Receiving this instruction, the way-of-reproduction designating unit 34 controls the data reproducing unit 30 where the reproduction control unit 33 is not provided, or controls the reproduction control unit 33 in case it is provided, so that at least one of the plurality of pieces of data in the above portion only are reproduced. In this case, the way-of-reproduction designating unit 34 may also control the reading unit 31 so that the reading unit 31 reads and supplies to the data reproducing unit 30 the above at least one of the plurality of pieces of data in the above portion only.

In the case wherein each piece of data stored in the storage medium is accompanied by one or more pieces of pointer information and/or data length information as explained before, the information detecting unit 32 in the constructions of FIG. 6 and the above three variations and any combinations of these variations, also detects these pieces of information.

When the information detecting unit 32 detects one or more pieces of pointer information accompanying a piece of data stored in the storage medium, the pointer information is supplied to the reading unit 31 information indicating as a location of a piece of data to be read next from the storage medium, so that the reading unit 31 traces and reads at least a portion of the plurality of pieces of data stored in the storage medium, based on the pointer information which accompanies each of the plurality of pieces of data.

When the information detecting unit 32 detects the data length information accompanying a piece of data stored in the storage medium, the data length information may be supplied to the reading unit 31 and/or the reproduction control unit 33 for use therein to perform and/or control the reading and/or reproducing operations, respectively. The data length information is, in particular, useful in separating respective pieces of data.

In the case wherein "no identification information" is used as one of the identification information as explained for the storage medium, the data reproducing unit 30 may reproduce one of the plurality of pieces of data in the above predetermined one of the plurality of ways of reproduction when the above identification information detecting unit 32 detects no identification information with the above one of the plurality of pieces of data. In the case wherein the reproduction control unit 33 is provided, the reproduction control unit 33 controls the data reproducing unit 30 to operate like this.

In the case wherein each of at least one of the plurality of pieces of data stored in the storage medium is accompanied by a plurality of pieces of pointer information which indicate, for each of the at least one of the plurality of pieces of data, a plurality of locations at which a plurality of candidates for a next piece among the plurality of pieces of data, which is to be reproduced next, are stored in the storage medium, respectively, the reading unit 31 traces and reads at least a portion of the above at least one of the plurality of pieces of data based on a selected one of the plurality of pieces of pointer information which accompany each of the above at least one of the plurality of pieces of data.

FIG. 8 is a diagram illustrating the basic construction of a reproducing apparatus according to the fourth aspect of the present invention. The reproducing apparatus of FIG. 8 is provided for reading and reproducing a plurality of pieces of data stored in a storage medium, where each of at least one of the plurality of pieces of data is assumed to be accompanied by a plurality of pieces of pointer information, for example, as indicated in FIGS. 4F and 4G.

As shown in FIG. 8, the reproducing apparatus of FIG. 8 contains the data reproducing unit 30, the reading unit 31, the information detecting unit 32, a pointer information selection control unit 35, and a pointer information selection rule designating unit 36.

The pointer information selection control unit 35 selects, as the above selected one of the plurality of pieces of pointer information, one of the plurality of pieces of pointer information which accompany each of the above at least one of the plurality of pieces of data, based on a selection rule. For example, this may be realized by the mode setting unit 302 and the controller 303 in the construction of FIG. 35, which are explained later.

As shown in FIG. 8, the pointer information selection rule designating unit 36 inputs a designation input which designates the above selection rule. For example, this may be realized by the mode setting unit 302 in the construction of FIG. 35, as explained later.

The above selection rule may be to select, as the above selected one, one of the plurality of pieces of pointer information which accompany each of the above at least one of the plurality of pieces of data, which appears first when reading the contents of the storage medium in the sequential order.

Otherwise, the above selection rule may be to select, as the above selected one, one of the plurality of pieces of pointer information which accompany each of the above at least one of the plurality of pieces of data, which indicates the nearest location in the storage medium.

Further, the above plurality of candidates may be pieces of data which are to be reproduced in different ways of reproduction, respectively.

The above pointer information selection control unit 35 and the pointer information selection rule designating unit 36 may be combined to the construction of FIG. 7.

Example Format of Multimedia Data (FIGS. 9, 10, 11, 12, 13, 14, 15, 16, 17, 18, and 19)

Figure 9:
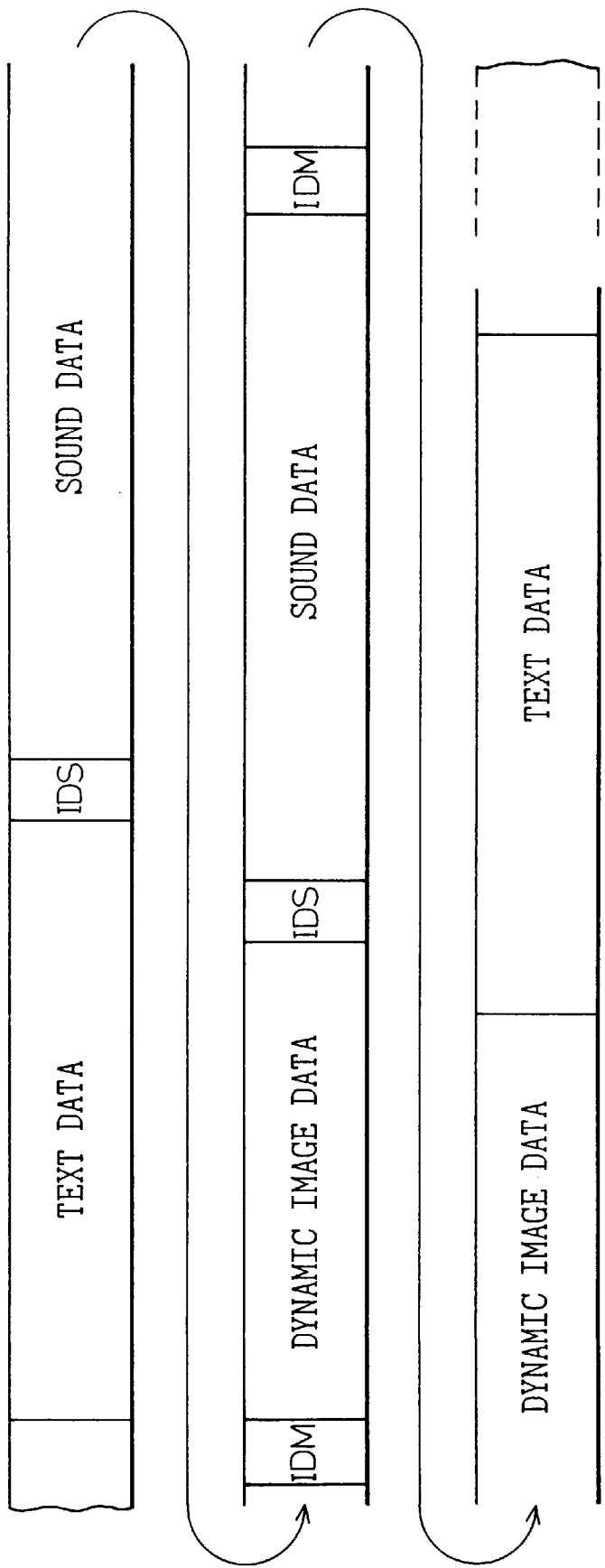
FIG. 9 is a diagram illustrating an example of multimedia data stored according to the first aspect of the present invention.

FIG. 9 is a diagram illustrating an example of multimedia data stored according to the first aspect of the present invention, which is explained with reference to FIG. 2. In FIG. 9, reference IDS denotes a piece of identification information indicating that a piece of sound data follows this piece of identification information, IDM denotes a piece of identification information indicating that a piece of dynamic image data follows this piece of identification information, TEXT DATA denotes a piece of text data, SOUND DATA denotes a piece of sound data, and DYNAMIC IMAGE DATA denotes a piece of dynamic image data. In this example, no piece of identification information accompanies each piece of text data. Namely, when no identification information precedes some data, this indicates that the data is text data.

When a piece of data is compressed, the fact that the data is compressed, may also be stored in the area of the piece of data. In addition, each of the above areas TEXT DATA, SOUND DATA, and DYNAMIC IMAGE DATA for the respective types of data constituting multimedia data, may contain any control information other than various kinds of information used for realizing the present invention. One of such control information may be a piece of control information which may be included a piece of dynamic image data for use to display a next piece of data after indication of the current dynamic image data is completed.

Figure 10:
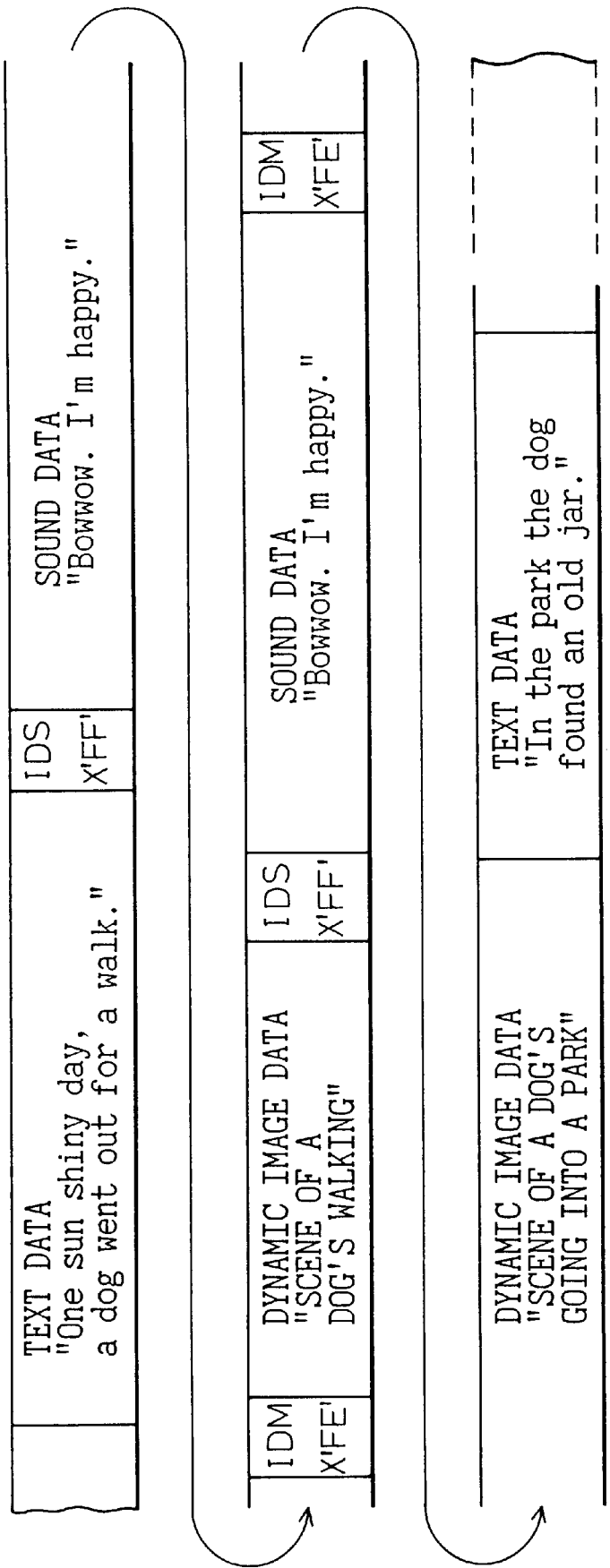
FIG. 10 is a diagram illustrating a concrete example of multimedia data stored in the manner of FIG. 9.

FIG. 10 is a diagram illustrating a concrete example of multimedia data stored in the manner of FIG. 9. In FIG. 10, the start code "X'FF'" is the above piece of identification information indicating that a piece of sound data follows this piece of identification information, and the start code "X'FE'" is the piece of identification information indicating that a piece of dynamic image data follows this piece of identification information.

Figure 11:
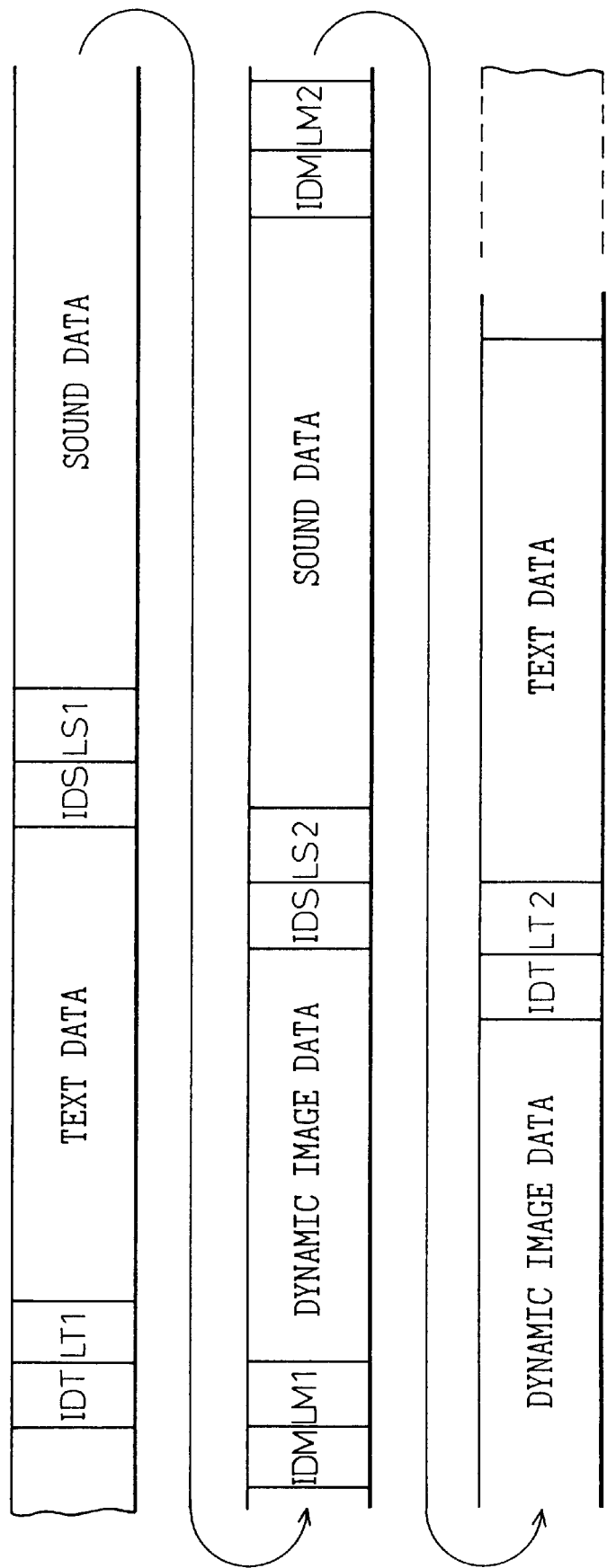
FIG. 11 is a diagram illustrating an example of multimedia data stored according to the first variation of the first aspect of the present invention.
Figure 12:
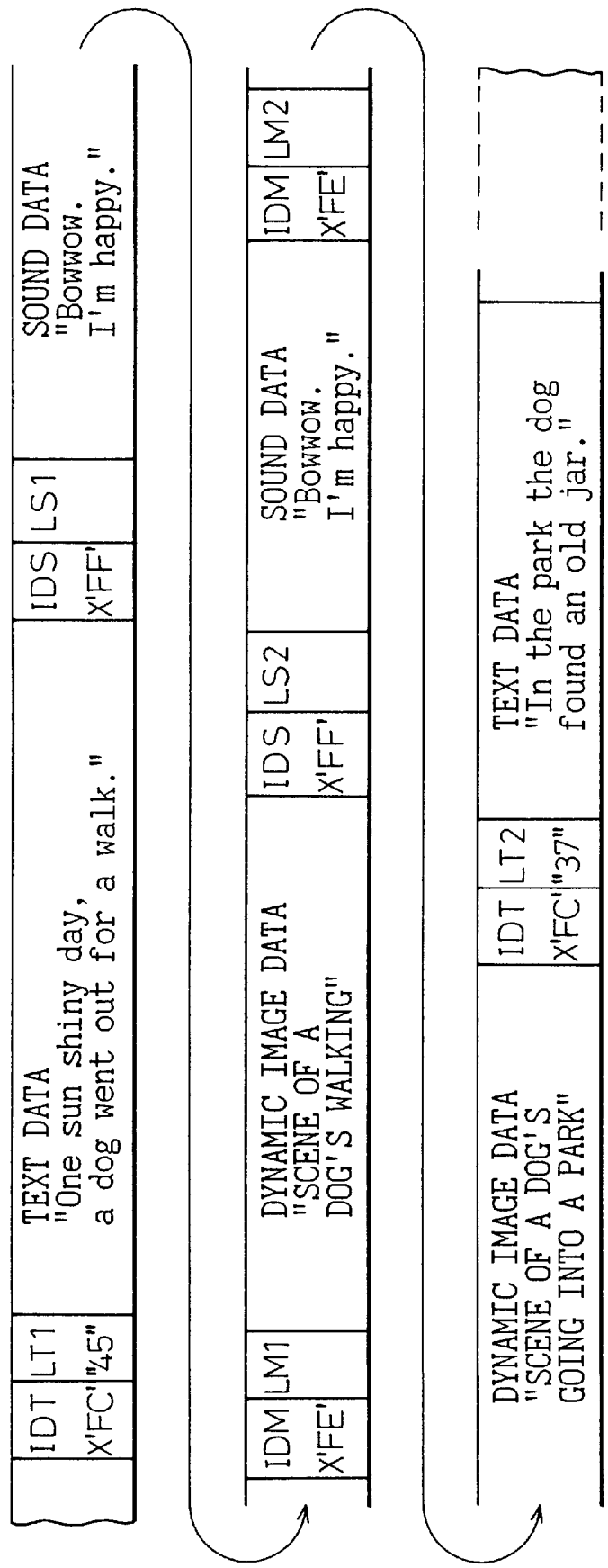
FIG. 12 is a diagram illustrating a concrete example of multimedia data stored in the manner of FIG. 11.

FIG. 11 is a diagram illustrating an example of multimedia data stored according to the first variation of the first aspect of the present invention, which is explained with reference to FIG. 4A. In FIG. 11, reference IDT denotes a piece of identification information indicating that a piece of text data follows this piece of identification information, LT1 and LT2 each denote a piece of data length information for a respective piece of text data, LS1 and LS2 each denote a piece of data length information for a respective piece of sound data, and LM1 and LM2 each denote a piece of data length information for a respective piece of dynamic image data. In this example, each piece of text data is accompanied by the piece of identification information IDT. FIG. 12 is a diagram illustrating a concrete example of multimedia data stored in the manner of FIG. 11. In FIG. 12, the start code "X'FC'" is the piece of identification information indicating that a piece of text data follows this piece of identification information.

Figure 13:
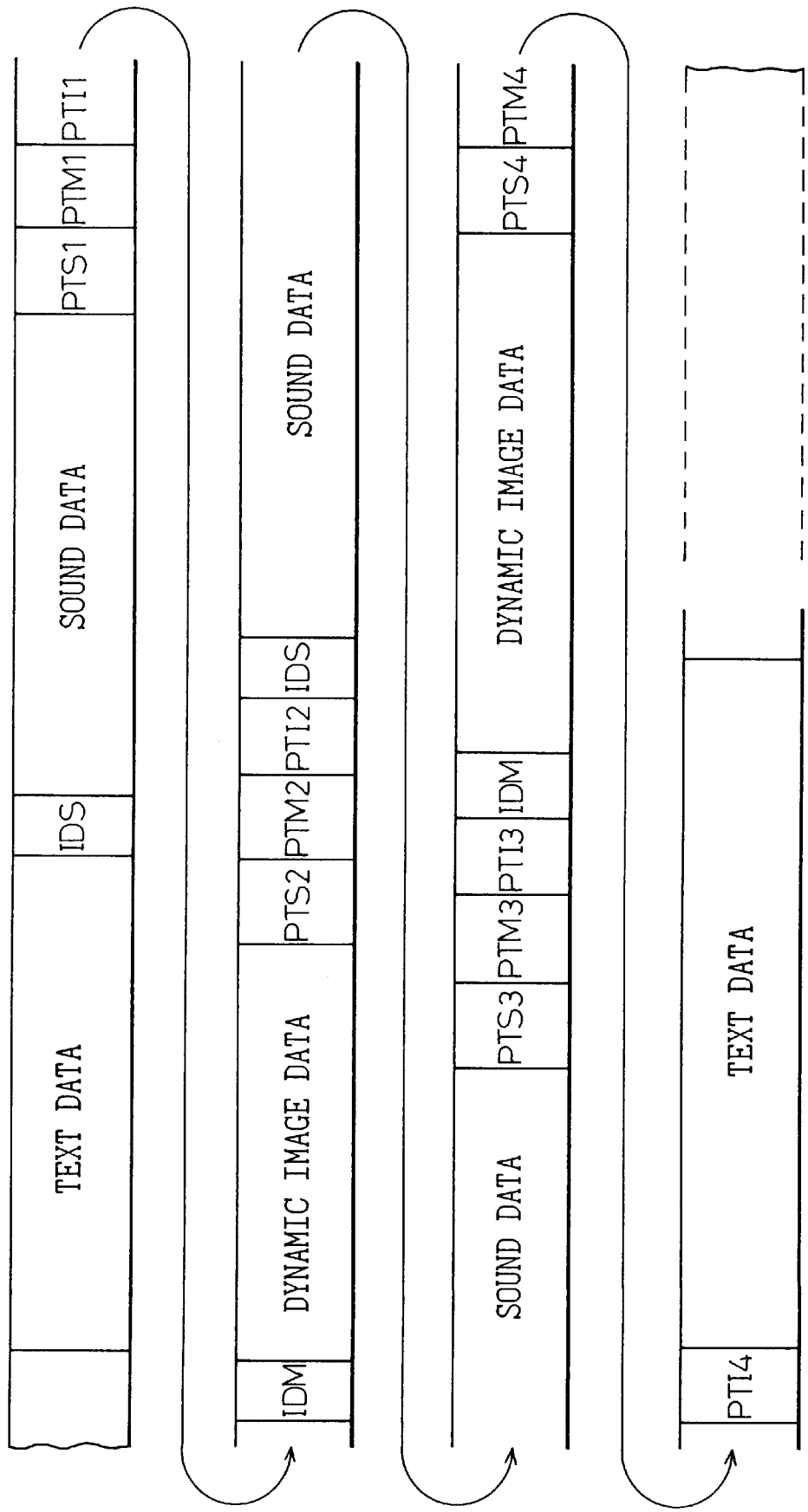
FIG. 13 is a diagram illustrating an example of multimedia data stored according to the second variation of the first aspect of the present invention.
Figure 14:
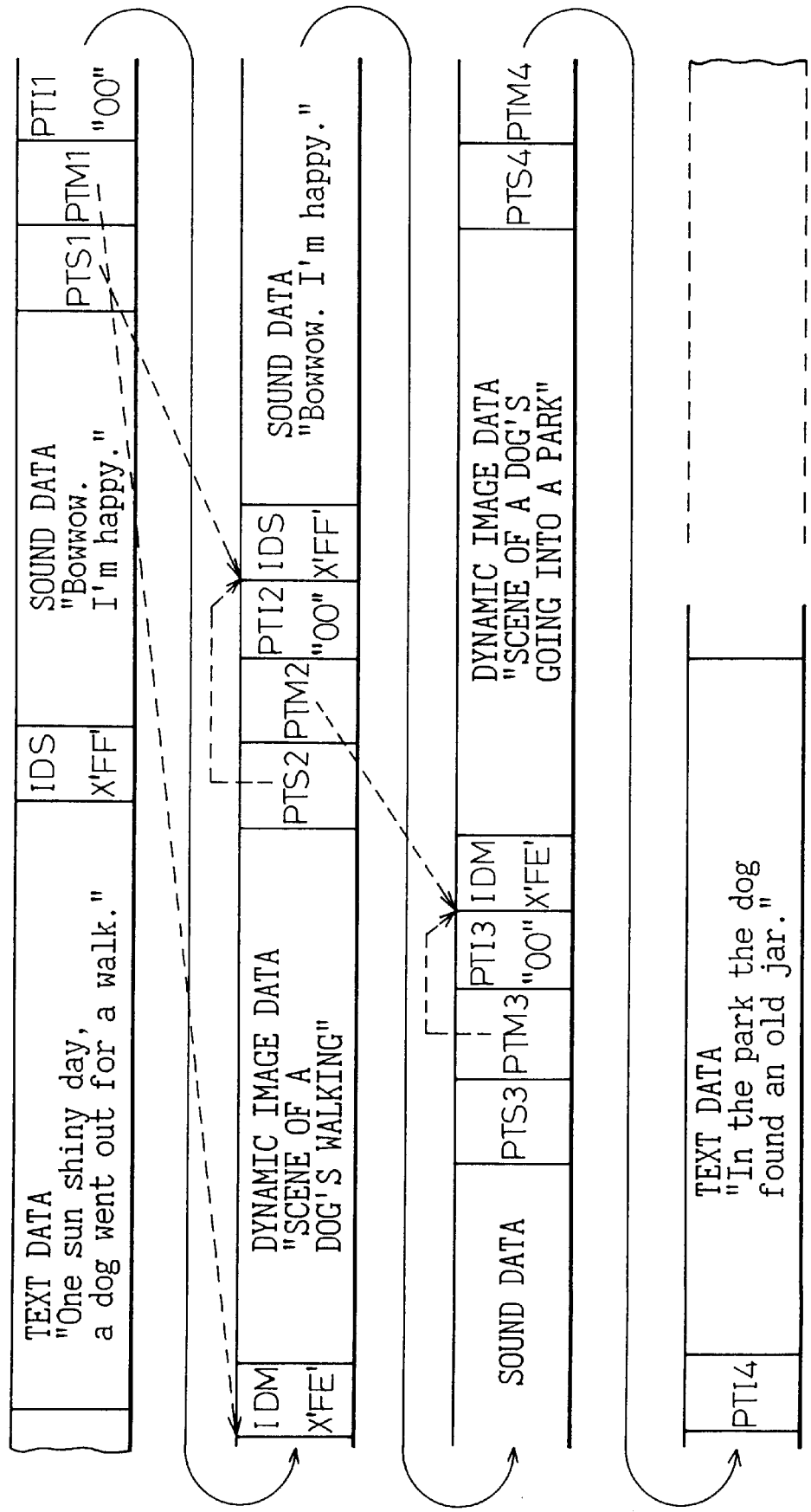
FIG. 14 is a diagram illustrating a concrete example of multimedia data stored in the manner of FIG. 13.

FIG. 13 is a diagram illustrating an example of multimedia data stored according to the sixth variation of the first aspect of the present invention, which is explained with reference to FIG. 4F. In FIG. 13, reference PTS1, PTS2, and PTS3 each denote a piece of pointer information for indicating the location at which a candidate for the next piece of sound data, which is to be reproduced next, is stored in the storage medium, PTM1, PTM2, and PTM3 each denote a piece of pointer information for indicating the location at which a candidate for the next piece of dynamic image data, which is to be reproduced next, is stored in the storage medium, and PTI1, PTI2, and PTI3 each denote a piece of pointer information for indicating the location at which a candidate for the next piece of static image data, which is to be reproduced next, is stored in the storage medium, where the next piece of the respective data means the data which is to be reproduced next in the pieces of data of the same type. FIG. 14 is a diagram illustrating a concrete example of multimedia data stored in the manner of FIG. 13. In FIG. 14, the dashed lines with arrows each indicate which piece of pointer information is directed to which piece of data, and "00" in each area for a piece of pointer information indicates that no pointer information is recorded therein.

Figure 15:
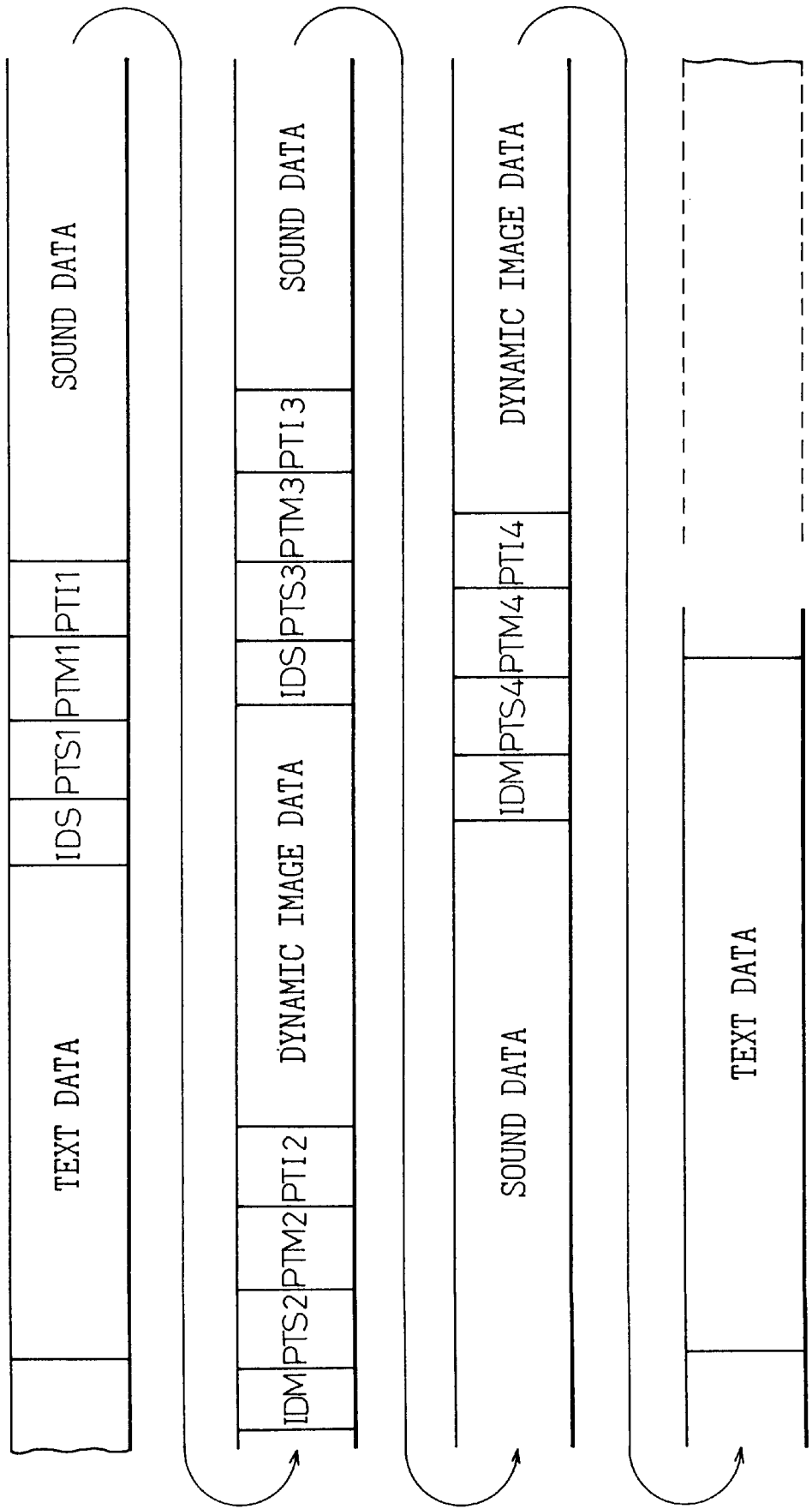
FIG. 15 is a diagram illustrating another example of multimedia data stored according to the second variation of the first aspect of the present invention.
Figure 16:
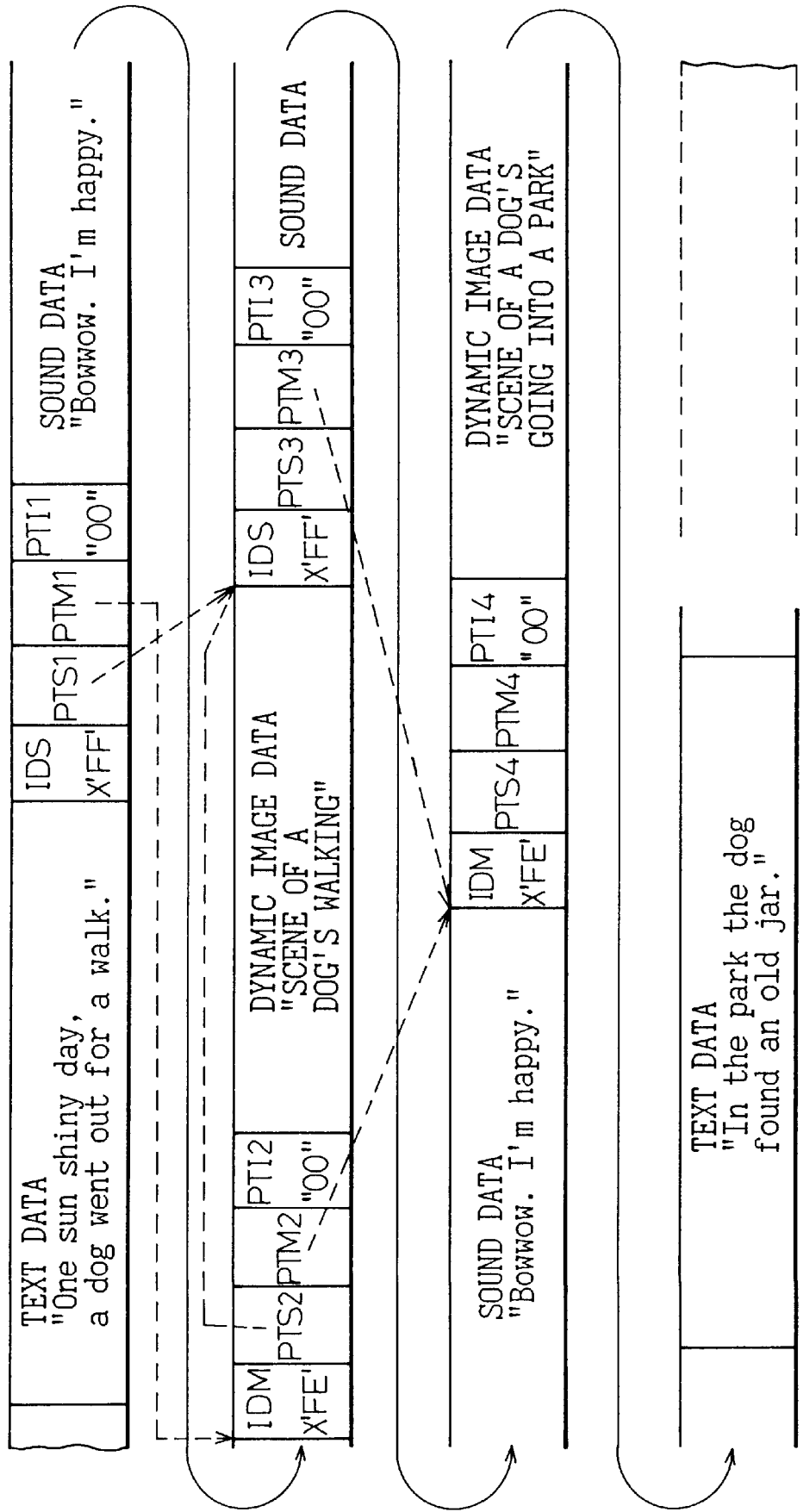
FIG. 16 is a diagram illustrating a concrete example of multimedia data stored in the manner of FIG. 15.

FIG. 15 is a diagram illustrating another example of multimedia data stored according to the sixth variation of the first aspect of the present invention. In the example of FIG. 15, the plurality of pieces of pointer information accompanying each piece of data precede each piece of data, while they follow the corresponding piece of data in the example of FIG. 13. FIG. 16 is a diagram illustrating a concrete example of multimedia data stored in the manner of FIG. 15.

Figure 17:
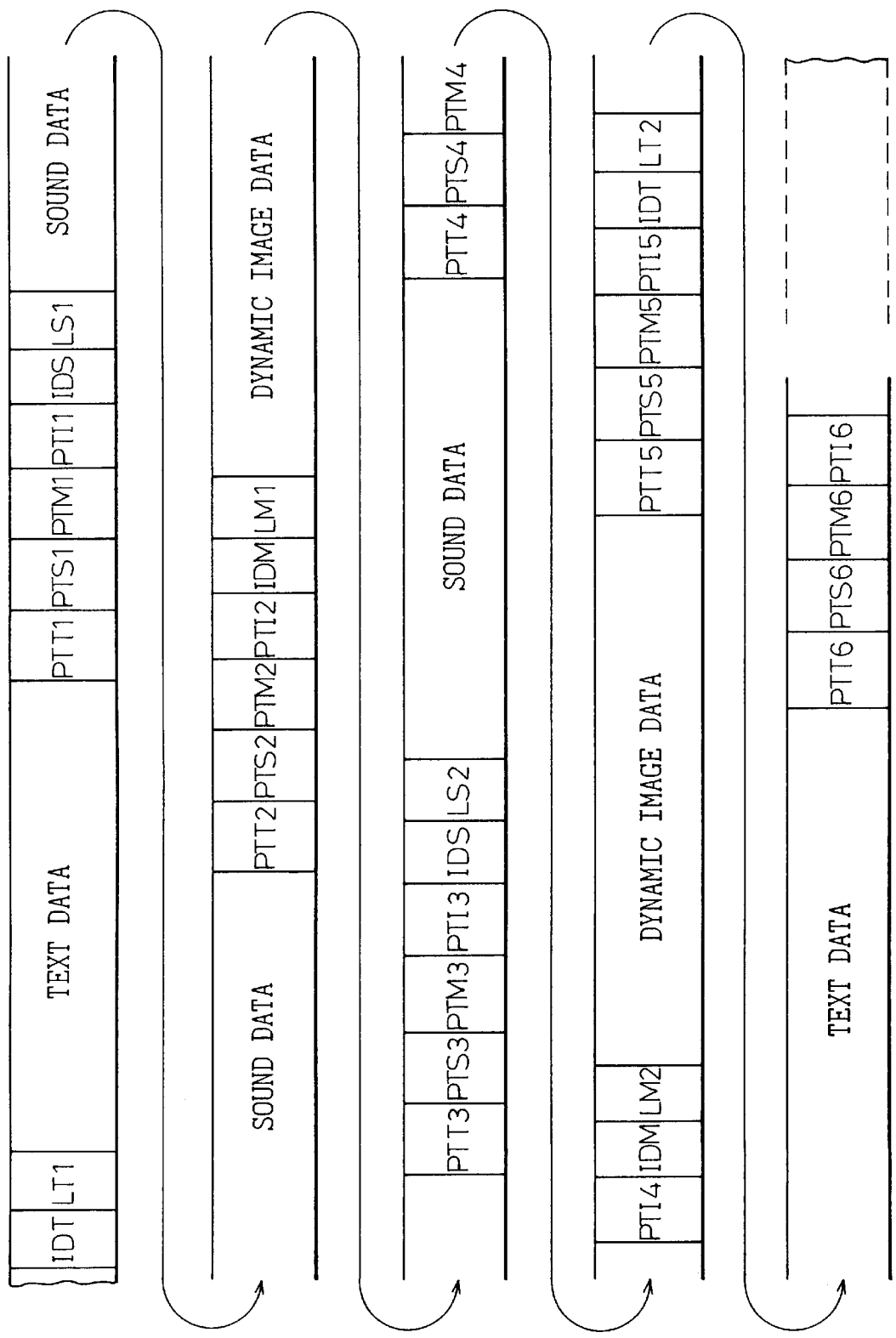
FIG. 17 is a diagram illustrating an example of multimedia data stored according to the third variation of the first aspect of the present invention.
Figure 18:
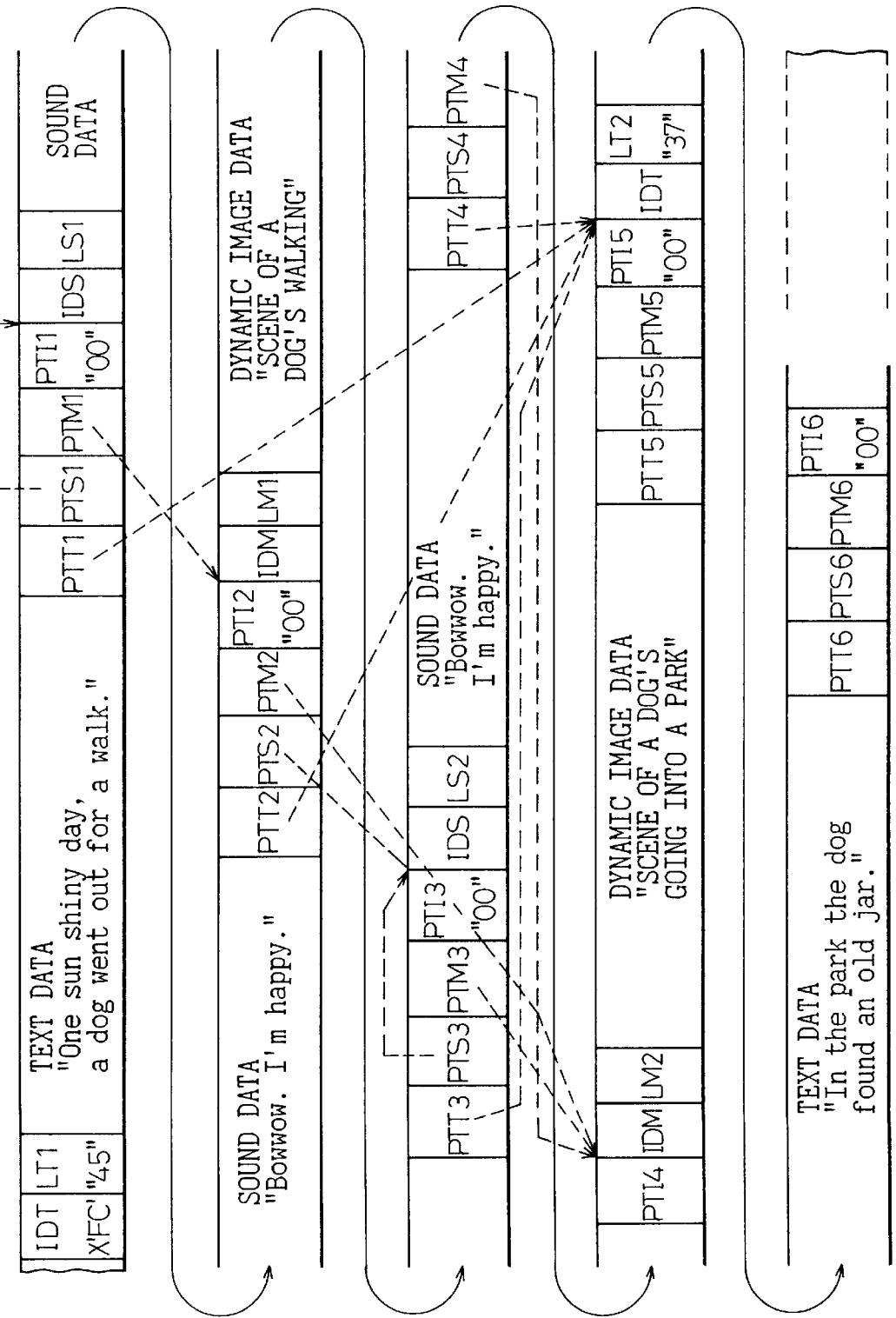
FIG. 18 is a diagram illustrating a concrete example of multimedia data stored in the manner of FIG. 17.

FIG. 17 is a diagram illustrating an example of multimedia data stored according to the seventh variation of the first aspect of the present invention, which is explained with reference to FIG. 4G. Namely, in the sequence of data pieces of FIG. 17, the pieces of data length information are inserted into the sequence of data pieces of FIG. 15. In addition, a piece of identification information accompanies each piece of text data in FIG. 17. FIG. 18 is a diagram illustrating a concrete example of multimedia data stored in the manner of FIG. 17.

Figure 19:
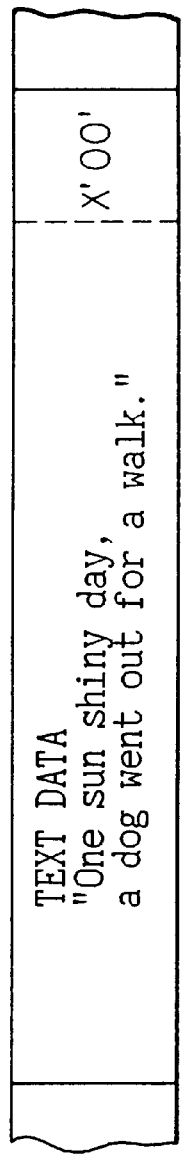
FIG. 19 is a diagram illustrating an example form of text data wherein a piece of text data is followed by an end code which indicates an end of a piece of text data.

FIG. 19 is a diagram illustrating an example form of text data wherein a piece of text data is followed by an end code which indicates an end of a piece of text data. In FIG. 19, "X'OO'" is the end code. In particular, in the formats containing at least one piece of text data, and not containing a piece of data length information, the end code located at the end of the piece of text data is useful for easily recognizing text data. Since, usually, pieces of data other than the text data contain in itself information which indicates the end position of the piece of data, the above end code will not be necessary.

Use of Specific Data Format (FIGS. 20, 21, 22, 23, and 24)

In the Japanese patent application, No. 7-31977 and the copending U.S. patent application Ser. No. 8/604,605, the inventor has proposed a data format which facilitates search and retrieval of pieces of data of a plurality of types. In this data format, a title and/or a comment in a form of a sequence of words or characters may be affixed to each piece of data to be searched and retrieved. This data format can be used as a data format for the respective pieces of data in FIGS. 2 and 4A to 4G. It should be noted that, the following explanations are provided for the cases wherein a language system in which alphabet characters are used, for example, English, German, French, Russian, Greek, Spanish, Portuguese, or the like. In the cases wherein a language system in which ideographic characters such as the Kanji characters, and/or the Kana characters, the Hangul characters or the like are used, for example, Chinese, Japanese, or Korean, the "number of words" referred to below may be replaced with a number of characters, and the "word" or the "sequence of words" referred to below may be replaced with a character or a sequence of characters, respectively.

Figure 20:
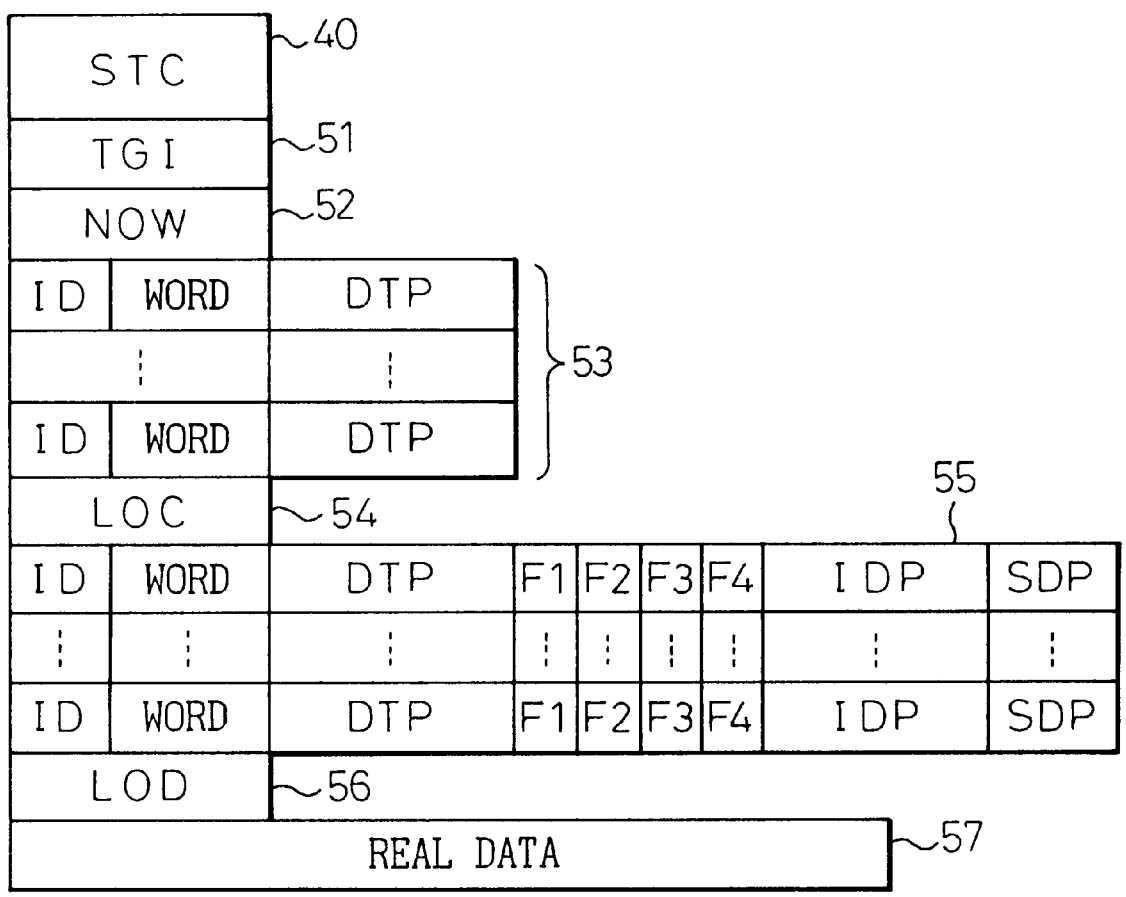
FIG. 20 is a diagram illustrating a detailed structure of a storage format for storing a piece of the dynamic image, sound, or static image data.

FIG. 20 is a diagram illustrating a detailed structure of a storage format for storing a piece of the dynamic image, sound, or static image data. In FIG. 20, reference numeral 40 denotes a start code (STC), which corresponds to the piece of identification information according to the present invention, 51 denotes tag information (TGI), 52 denotes the number of words (NOW), 53 denotes a sequence of words (SOW) of the title, 54 denotes a length of a comment (LOC), 55 denotes a comment portion (COM), 56 denotes a length of data (LOD), and 57 denotes a piece of real data (REAL DATA), for example, dynamic image data, sound data, or static image data. In this format, all of the information other than the real data 57 is management information for the multimedia data.

Namely, the format of FIG. 20 starts with the start code (STC) 40 which corresponds to the aforementioned piece of identification information, and the tag information (TGI) 51, the number of words (NOW) of a title 52, the sequence of words (SOW) of the title 53, the length of the comment portion (LOC) 54, the comment portion 55, the length of the data (LOD) 56, and the real data 57 follows the start code (STC) 40.

The tag information 51 shown in FIG. 20 may contain: identification information for indicating which one of the dynamic image, sound, and static image data is stored as the real data within the format of FIG. 20; a flag for indicating presence or absence of the comment portion; a flag for indicating presence or absence of sound data during displaying dynamic or static image; and a flag for indicating whether the real data is contained in the format of FIG. 20, or only an address of real data is contained in the format of FIG. 20. One or more of these items in the tag information can be dispensed, or another item may be added as the need arises.

In the sequence of words 53 of the title, an identifier flag (ID) precedes each word in the sequence, and information on the data top position (DTP) may follow each word in the sequence 53. The identifier flag ID in the sequence of words 53 indicates the presence or absence of a pointer to the data top position after each word. The data top position indicates the top position of the piece of multimedia data. In this example, the data top position indicates the position of the tag information 51.

Whether or not the comment portion 55 is added is indicated by the above flag indicating presence or absence of the comment portion. For example, it is possible to set, as a comment in the comment portion 55, a sequence of words or sound data for use in utilizing the real data. The comment portion 55 contains a sequence of words of the comment, and an identifier flag (ID) precedes each word in the sequence of words of the comment. In addition, any or all of a pointer to the data top position (DTP), flags (F1 to F4), a pointer to an image data position (IDP, a top position of the dynamic image or static image), and a pointer to a sound data position (SDP, a top position of the sound data), may follow each word in the sequence of the comment. The image data position and the sound data position may be indicated by an address or a time.

The identifier flag ID in the comment portion 55 indicates the presence or absence of the above pointer to the data top position, the flags F1 to F4, the above pointer to the image data position (IDP), and the above pointer to the sound data position (SDP). The identifier flag ID "00" indicates that no information follows the word which follows the identifier flag ID. The identifier flag ID "01", indicates that no pointer to the data top position exists, and the other information including the flags F1 to F4, the pointer to the image data position, and the pointer to the sound data position follows the word which follows the identifier flag ID. The identifier flag ID "10" indicates that only the word and the data top position follow the identifier flag ID. The identifier flag ID "11" indicates that the word, the data top position, the flags F1 to F4, the pointer to the image data position, and the pointer to the sound data position follow the identifier flag ID. When a sequence of words is to be searched for, the identifier flag ID is masked and only the words are used for a matching operation.

The flag F1 indicates the presence or absence of the pointer to the image data position after the flags F1 to F4. The flag F1="0" indicates that no pointer to the image data position exists after the flags F1 to F4, while the flag F1="1" indicates that a pointer to the image data position exists after the flags F1 to F4. The flag F2 indicates the presence or absence of the pointer to the sound data position after the flags F1 to F4. The flag F2="0" indicates that no pointer to the sound data position exists after the flags F1 to F4, while the flag F2="1" indicates that the pointer to the sound data position exists after the flags F1 to F4. The flag F3 indicates that the pointer to the image data position is indicated by an address or a time according to the flag F3="0" or F3="1", respectively. The flag F4 indicates that the pointer to the sound data position is indicated by an address or a time according to the flag F4="0" or F4="1", respectively.

The address of the image data position may be either a relative address or an absolute address. Further, when it is predetermined that only one of the sound data and the image data is handled as the multimedia data, the flags F1 and F2 may be unnecessary.

Figure 21:
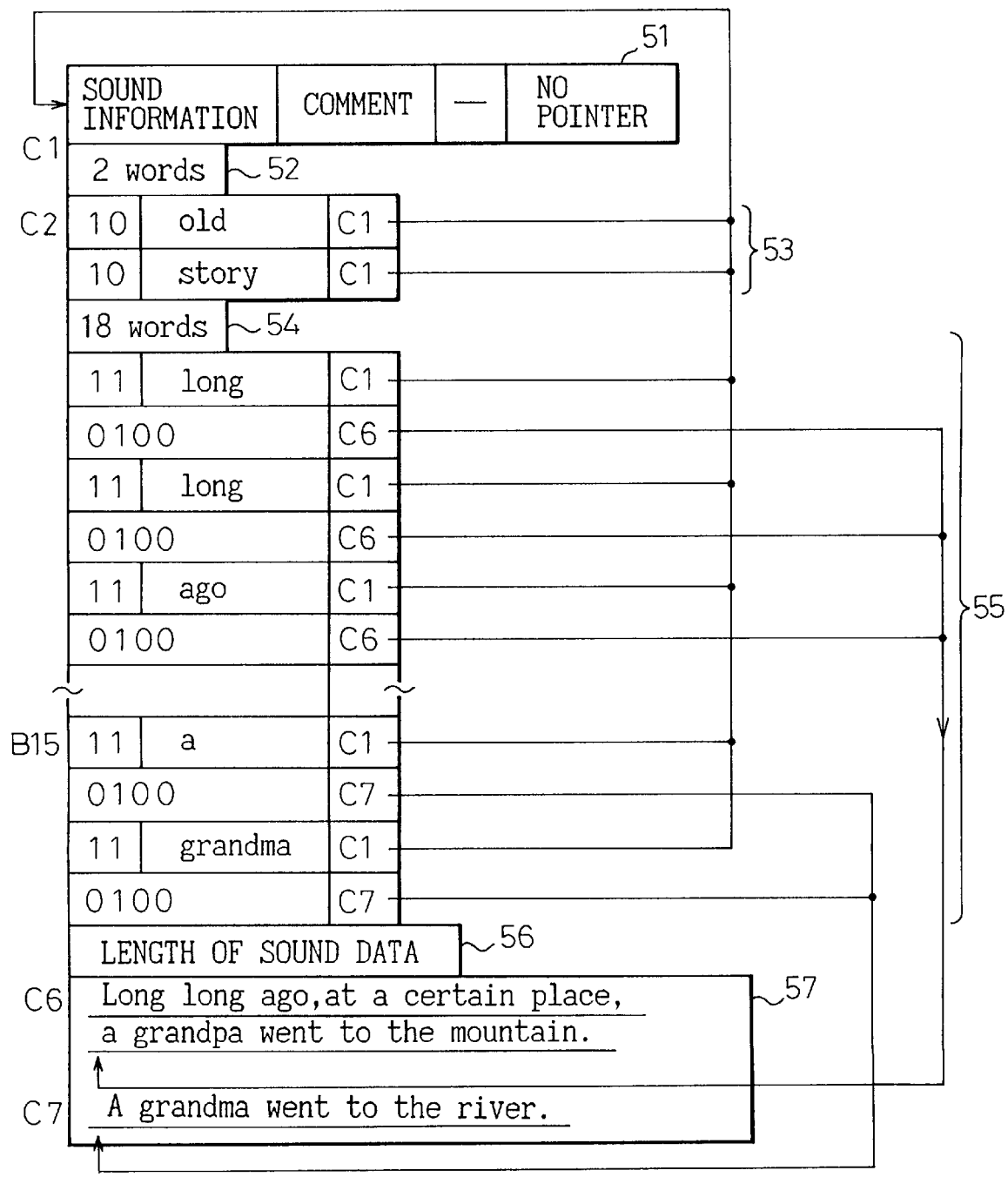
FIG. 21 is a diagram illustrating an example use of the multimedia data format of FIG. 20.

FIG. 21 is a diagram illustrating an example use of the multimedia data format of FIG. 20. In this example, sound data is recorded in the multimedia data format of FIG. 20, and the sound data contains a first sound message, "Long long ago, at a certain place, a grandpa went to the mountain." and a second sound message, "A grandma went to the river."

In FIG. 21, the tag information 51 indicates that the type of data is sound data, a comment is contained in the format, and the sound data per se is contained in the format. The number of words of the title 52 indicates that the length of the title is two words. The area 53 of the sequence of words of the title contains the title "old story". In the area 53, each word is preceded by the identifier flag "10", which means only the word and the data top position follow the identifier flag, and each word in the area 53 is followed by the pointer "C1", which is directed to the data top position. The number of words of the comment 54 indicates that the length of the comment is eighteen words. The area 55 of the sequence of words of the comment contains, as the comment, all of the contents of the above sound message in the form of text. In the area 55, each word is preceded by the identifier flag "11", which means the word, the data top position, the flags F1 to F4, the pointer to the image data position, and the pointer to the sound data position follow the identifier flag, and thus each word in the area 55 is followed by the flags F1 to F4 ("0100") and the pointer "C6" or "C7". The flags F1 to F4 ("0100") indicates that only a pointer to the sound data position follows the flags. The pointer "C6", which follows each word of the first portion of the comment corresponding to the first message, is directed to the sound data position (top address) of the above first message, and the pointer "C7", which follows each word of the second portion of the comment corresponding to the second message, is directed to the sound data position (top address) of the above second message. Since the search operation is carried out in the sequence of words in the area 55 as explained below, when a specific sequence of words corresponding to a piece of multimedia data to be retrieved is found by the search operation, the data position of the piece of multimedia data to be retrieved can be immediately accessed based on the pointer "C6" or "C7". In the format of FIG. 21, the length of the sound data 56 and the sound data per se follow the above information.

Figure 22:
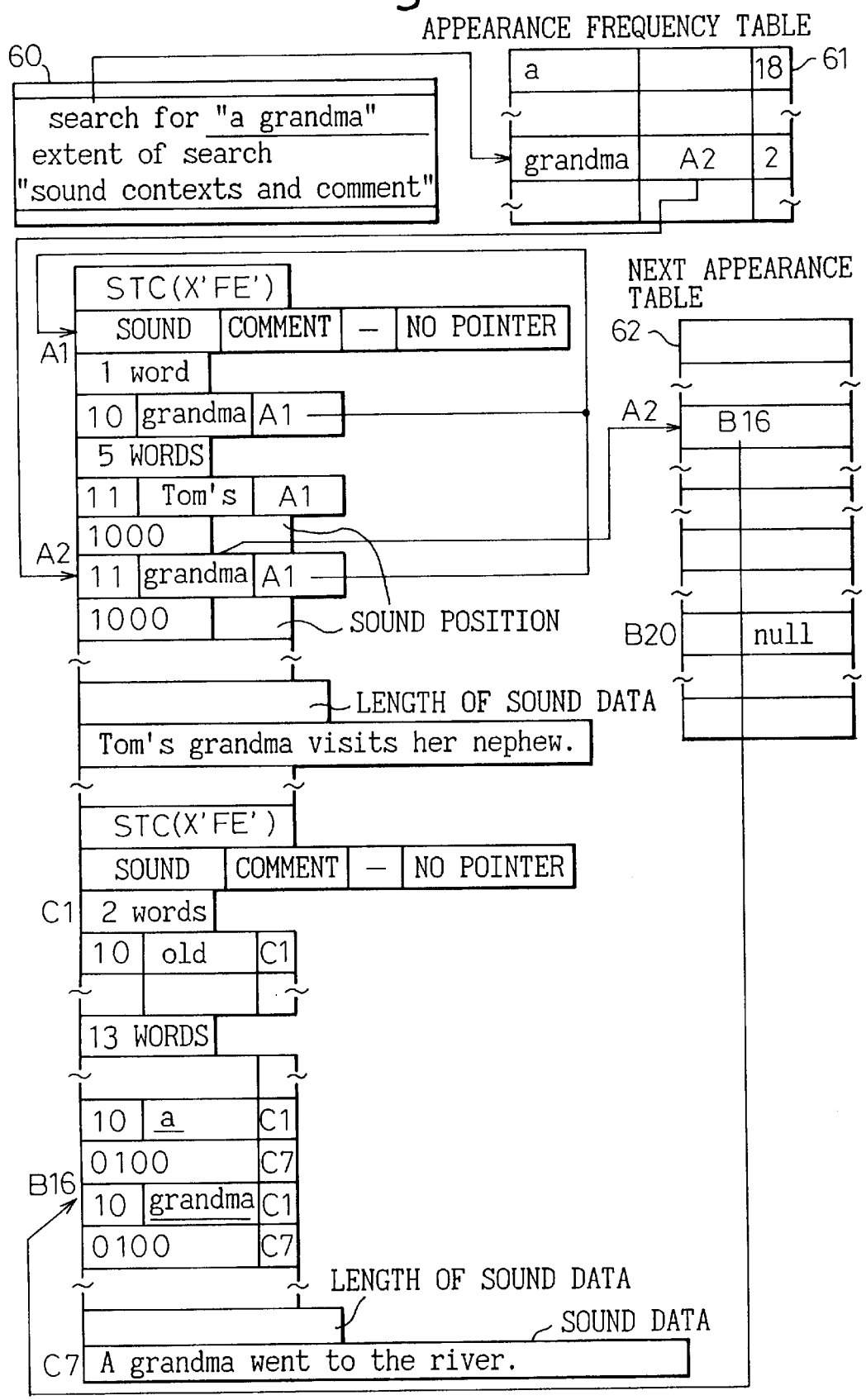
FIG. 22 is a diagram illustrating an example operation of searching for a piece of multimedia data stored in the multimedia data format of FIG. 20 in a storage medium.
Figure 24:
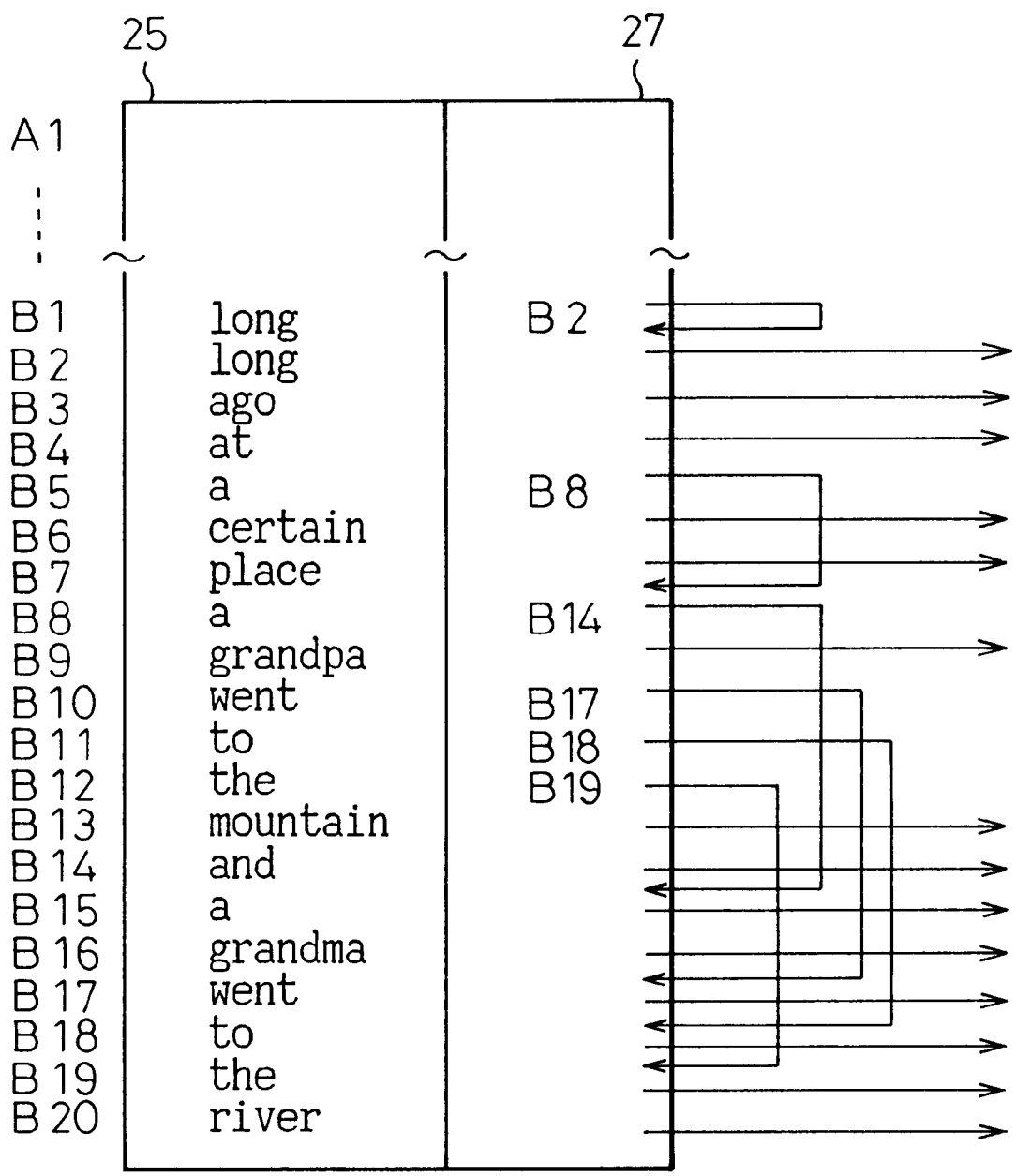
FIG. 24 is a diagram illustrating an example of the next appearance table.

The method of searching for a piece of multimedia data stored in the multimedia data format of FIG. 20 is explained below with reference to FIG. 22. FIG. 22 is a diagram illustrating an example operation of searching for a sequence of words contained in two pieces of multimedia data, where each piece is stored in the multimedia data format of FIG. 20 in a storage medium. In FIG. 22, reference number 60 denotes a display indication which is information displayed by a display device for prompting the operator to input the operator's instructions during the search operation, 61 denotes an appearance frequency table, and 62 denotes a next appearance table. An example of the appearance frequency table is illustrated in FIG. 23, and an example of the next appearance table is illustrated in FIG. 24. As indicated in FIG. 23, the appearance frequency table 61 indicates the first appearance position and the appearance frequency for each word which appears at least once in the comments affixed to one or more pieces of media data stored in the format of FIG. 20. The first appearance position is a position at which the word first appears in the comments, and the appearance frequency is the number of times the word appears in the comments. As indicated in FIG. 24, the next appearance table 62 indicates a next appearance position in the comments for a respective word constituting the comments affixed to the one or more pieces of media data stored in the format of FIG. 20. The next appearance position is a position at which the same word appears next in the comments. In FIG. 24, A1 . . . B20 are addresses of the respective words constituting these comments. The appearance frequency table 61 and the next appearance table 62 are produced when recording these pieces of multimedia data in the data format of FIG. 20 in a storage medium (or generally in a data storage device). These tables may be provided for the entire multimedia data including a plurality of types, or for each type of data.

Returning to FIG. 22, the display indication 60 of FIG. 22 prompts the operator to designate a sequence of words to be searched for, and an extent of search within which the search operation is to be performed. In this example, it is assumed that the sequence of words to be searched for, is "a grandma", and the extent of search is "sound contents and comment".

When the search system receives the above designation input, first, the appearance frequency table 61 is referred to, for looking up the appearance frequencies of the words "a" and "grandma" in the appearance frequency table 61, the least frequently appearing one of these words which appears least frequently in the comments is determined, and the above first appearance position of the least frequently appearing word is obtained. In this example, the word "grandma" is the least frequently appearing word according to the appearance frequency table of FIG. 23, and the first appearance position of the word "grandma" is the address A2. Then, the words in the addresses preceding and following the above first appearance position (A2) of the least frequently appearing word are read for comparing the above sequence of words "a grandma" with a first sequence comprised of the words in the preceding address and the first appearance position, and with a second sequence comprised of the words in the first appearance position and the preceding address. When one of the first and second sequences coincides with the above sequence of words to be searched for, the search operation is completed. In this example, neither the first and second sequence of words containing the word "grandma" in the address A2, coincides with the above sequence of words "a grandma" to be searched for. When neither the first and second sequence of words coincides with the above sequence of words to be searched for, the next appearance table 62 is referred to again, for looking up the above next appearance position, which is a position at which the word "grandma" appears next in the sequence of words. In this example, the next appearance position of the word "grandma" is the address B16 according to the next appearance table 62. Then, the words in the addresses preceding and following the above next appearance position (B16) of the least frequently appearing word "grandma" are read for comparing the above sequence of words "a grandma" with a third sequence comprised of the words in the preceding address and the next appearance position, and with a fourth sequence comprised of the words in the next appearance position and the preceding address. Similar operations are repeated until a coincidence with the sequence of words "a grandma" is found in the comment. In this example, the sequence "a grandma" is found as the above third sequence containing the word "grandma" in the address B16. When the coincidence is found, first, the title is read from the storage medium based on the data top position (C1 in this example), which is stored following the word "grandma" (in the address B16 in this example) in the coincided sequence, and is displayed as the display indication. Then, the sound data ("a grandma went to the river." in this example), which is directed to by the pointer (C7 in this example), stored following the word "grandma" in the coincided sequence, is read from the storage medium, and is output from a speaker in a multimedia data reproducing apparatus, which is explained later.

Figure 25:
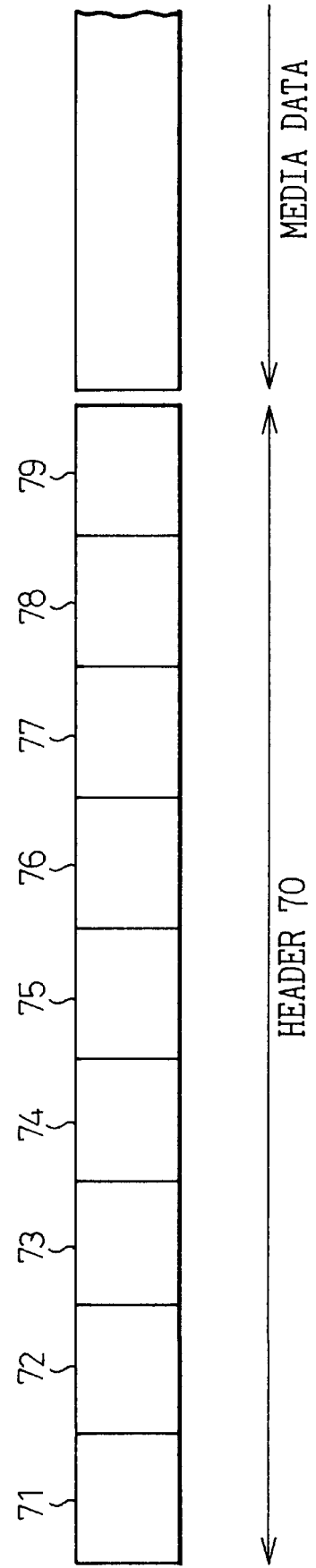
FIG. 25 is a diagram illustrating an example of the header information which is recorded preceding the multimedia data.

Header Information (FIG. 25)

When storing a plurality of pieces of data in a storage medium, header information which indicates whether or not the above-explained specific data format of FIG. 20 is used, can be recorded, for example, at the top position of the storage medium, i.e., before the aforementioned data formats.

FIG. 25 is a diagram illustrating an example of the header information which is to be recorded preceding the multimedia data. This header information contains a plurality (nine) of control areas 71 to 79. The first control area 71 contains information which indicates whether the aforementioned pointer information is located before the data, for example, as indicated in FIG. 4B, or after the data, for example, as indicated in FIG. 4C. The second control area 72 contains information which indicates which one of sound data, dynamic image data, or static image data is stored as data other than text data. This information may be indicated, for example, by three bits. The third control area 73 contains information which indicates whether or not the above pointer information contains a piece of pointer information directed to a location of text data. The fourth control area 74 contains information which indicates whether or not the above pointer information contains a piece of pointer information directed to a location of sound data. The fifth control area 75 contains information which indicates whether or not the above pointer information contains a piece of pointer information directed to a location of dynamic image data. The sixth control area 76 contains information which indicates whether or not the above pointer information contains a piece of pointer information directed to a location of static image data. The seventh control area 77 contains information which indicates whether each piece of text data is accompanied by the identification information which indicates the piece of data which the identification information accompanies is text data, or no identification information accompanies each piece of text data. The eighth control area 78 contains information which indicates whether or not each piece of data is accompanied by the data length information. The ninth control area 79 contains information which indicates whether or not each piece of data is stored in the data format of FIG. 20.

Embodiment of Recording Apparatus (FIGS. 26, 27, 28, 29, 30, 31, 32, 33, 34A, and 34B)

Figure 26:
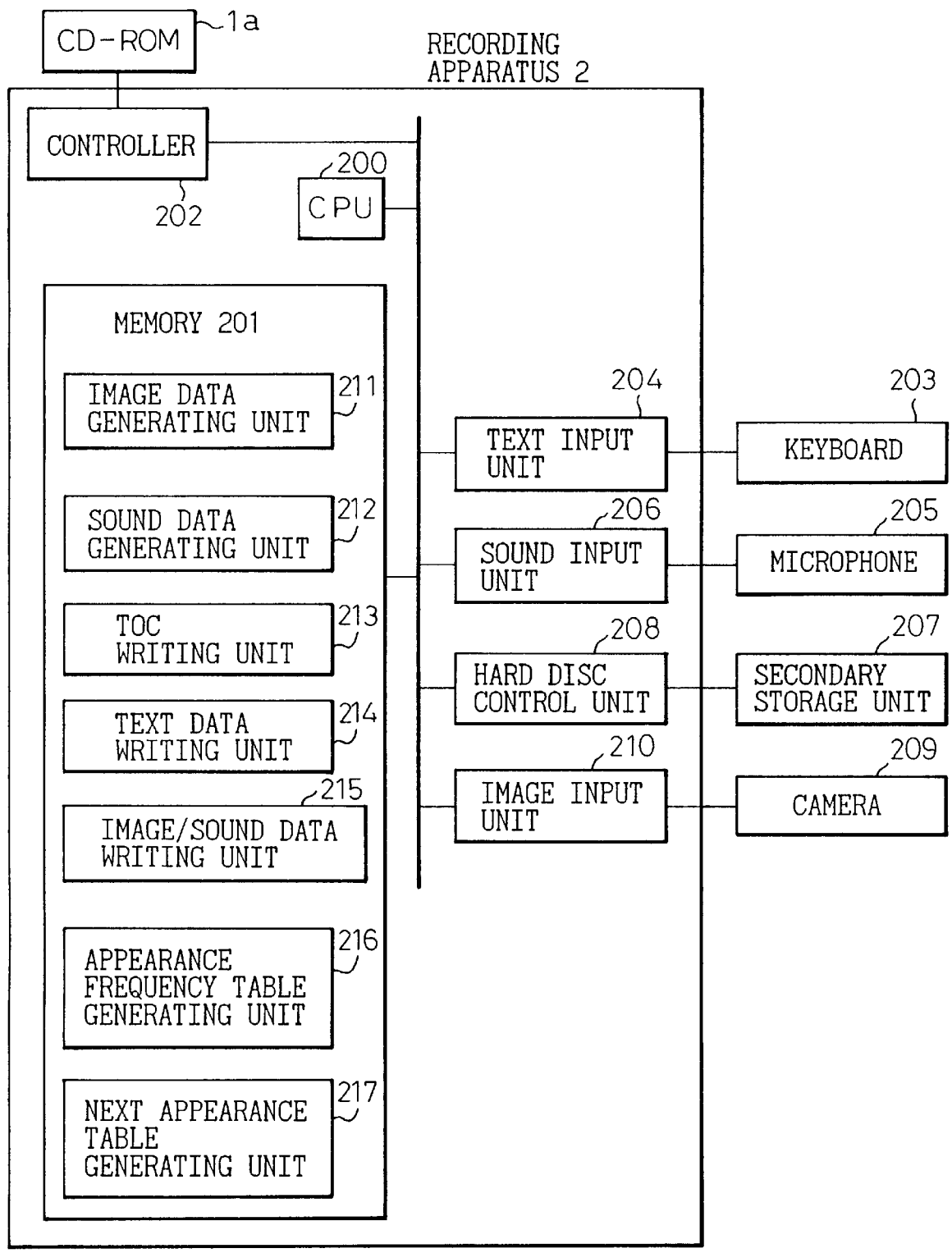
FIG. 26 is a diagram illustrating a multimedia data recording apparatus as an embodiment of the recording apparatus according to the second aspect of the present invention.

FIG. 26 is a diagram illustrating a multimedia data recording apparatus as an embodiment of the recording apparatus according to the second aspect of the present invention. In FIG. 26, reference numeral 1a denotes a CD-ROM, 200 denotes a central processing unit, 201 denotes a memory, 202 denotes a controller, 203 denotes a keyboard, 203 denotes a text input unit, 205 denotes a microphone, 206 denotes a sound input unit, 207 denotes a secondary storage unit, 208 denotes a hard disc control unit, 209 denotes a camera, 210 denotes an image input unit, 211 denotes an image data generating unit, 212 denotes a sound data generating unit, 213 denotes a TOC writing unit, 214 denotes a text data writing unit, 215 denotes an image/sound data writing unit, 216 denotes an appearance frequency table generating unit, and 217 denotes a next appearance table generating unit.

The text input unit 204 is an interface unit for receiving text data input from the keyboard 203 or any other source of text data. The sound input unit 206 is an interface unit for receiving sound data input from the microphone 205 or any other source of sound data. The hard disc control unit 208 or generally, a secondary storage device control unit, receives data (text data, sound data, dynamic image data, or static image data) stored in the secondary storage unit 207. The secondary storage unit 207 may be a hard disk device, an optical disk device, or any other data storage device. The image input unit 210 receives image data input from the camera 209, or any other source of image data.

Although not shown, the CD-ROM 1a is inserted in a CD-ROM recording (writing) mechanism which is a portion of the multimedia data recording apparatus of FIG. 26, and the controller 202 controls the CD-ROM recording (writing) mechanism, under the control of the central processing unit 200 which executes programs loaded on the memory 201. The image data generating unit 211, the sound data generating unit 212, the TOC writing unit 213, the text data writing unit 214, the image/sound data writing unit 215, the appearance frequency table generating unit 216, and the next appearance table generating unit 217 are each a program unit developed in the memory 201 for being executed by the central processing unit 200. Alternatively, each program unit may be realized by hardware logic circuitry or a combination of the hardware logic circuitry and software.

Figure 27:
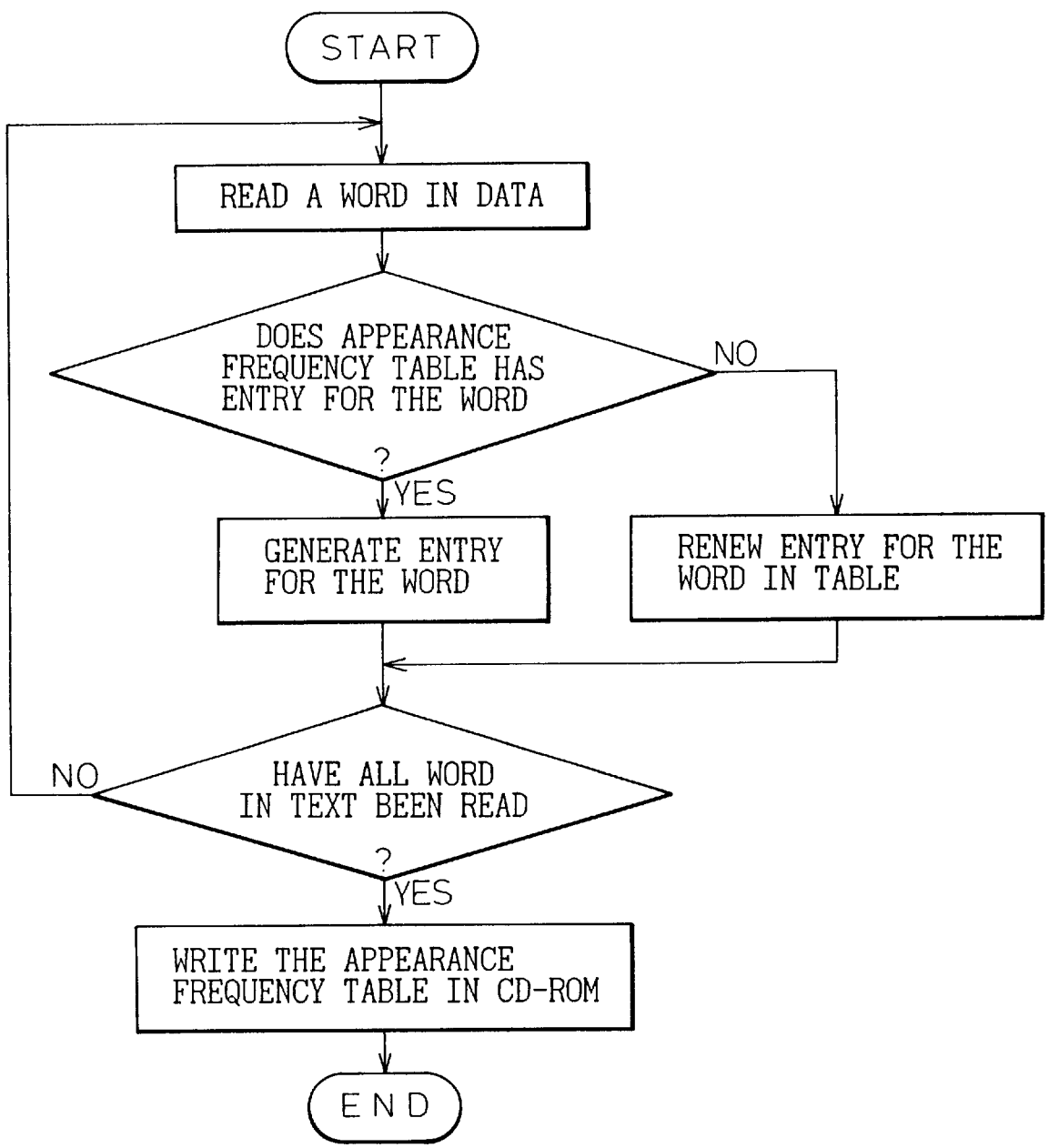
FIG. 27 is a diagram illustrating the operation of the appearance frequency table generating unit 216 in FIG. 26.
Figure 28:
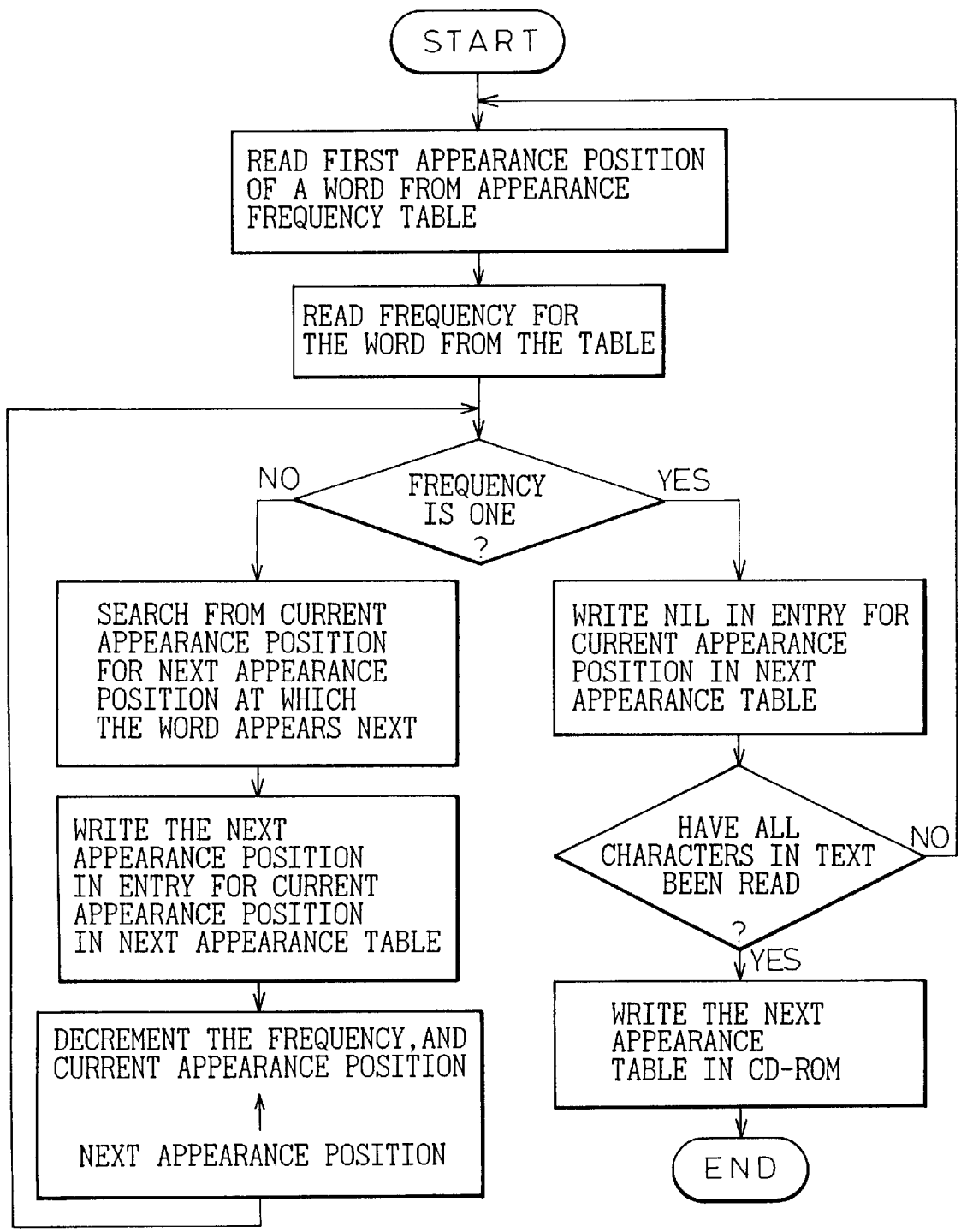
FIG. 28 is a diagram illustrating the operation of the next appearance table generating unit 217 in FIG. 26.

When the data is written in the CD-ROM 1a in the format of FIG. 20, the appearance frequency table generating unit 216 generates and writes in the CD-ROM 1a, the appearance frequency table in accordance with the process flow indicated in FIG. 27, and the next appearance table generating unit 217 generates and writes in the CD-ROM 1a, the next appearance table in accordance with the process flow indicated in FIG. 28. The processes of FIGS. 27 and 28 will be self-explanatory.

Figure 29:
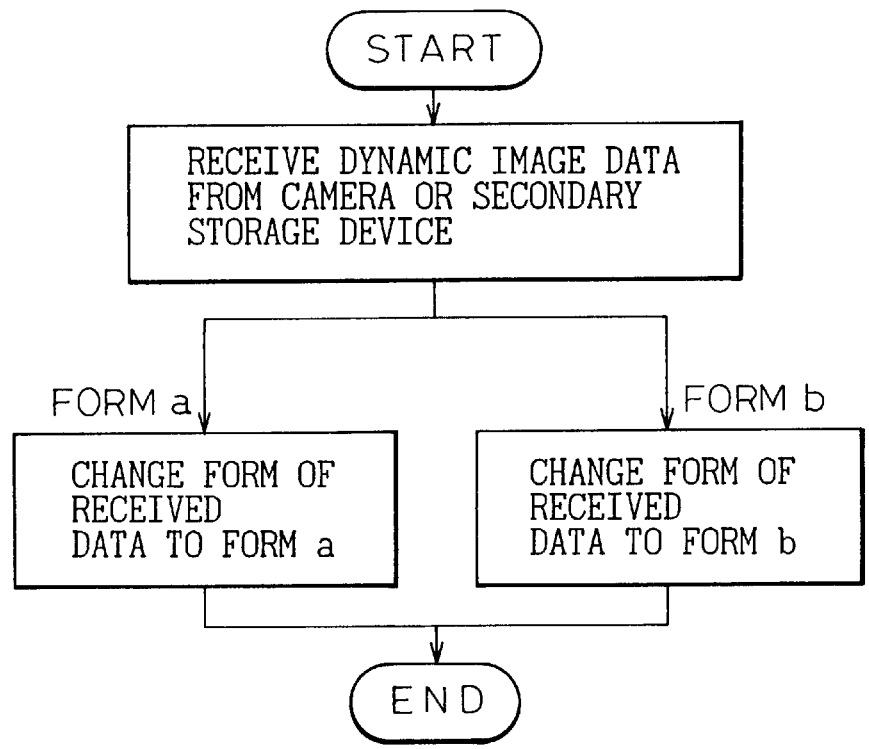
FIG. 29 is a diagram illustrating the operation of the image data generating unit 211 in FIG. 26.

The image data generating unit 211 generates dynamic image data or static image data to be written in the CD-ROM 1a. The image data generating unit 211 may further generate the aforementioned pointer information and the data length information. The image data generating unit 211 may further have a function of changing the form of the image data received through the image input unit 210, into a selected one of a plurality of optional forms, for example, as indicated in FIG. 29. In this case, the image data generating unit 211 may affix, to the image data, information which indicates the form of the image data. Such information may be contained in a header which precedes the image data when stored in the storage medium. One of such optional forms is a compressed form. Namely, the image data generating unit 211 may have a function of changing the form of the image data into a selected one of the compressed form and a non-compressed form. In addition, the information to be contained in the data format of FIG. 20 may also be generated in the image data generating unit 211.

Figure 30:
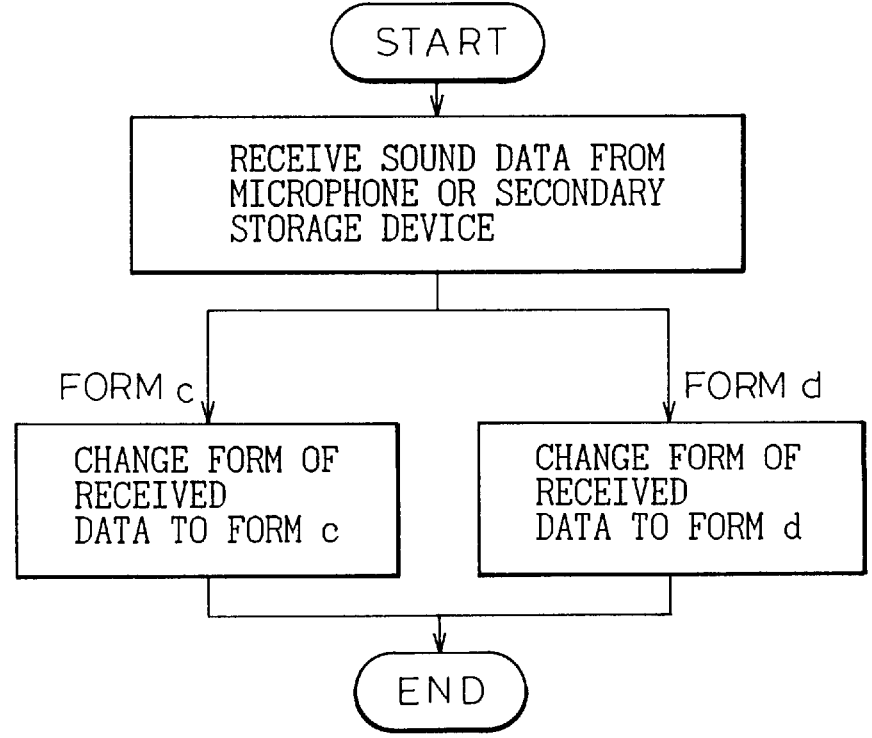
FIG. 30 is a diagram illustrating the operation of the sound data generating unit 212 in FIG. 26.

The sound data generating unit 212 generates sound data to be written in the CD-ROM 1a. The sound data generating unit 212 may further generate the aforementioned pointer information and the data length information. Similar to the image data generating unit 211, the sound data generating unit 212 may further have a function of changing the form of the sound data received through the sound input unit 206 into a selected one of a plurality of optional forms, for example, as indicated in FIG. 30. In this case, the sound data generating unit 212 may affix, to the sound data, information which indicates the form of the sound data. Such information may be contained in a header which precedes the sound data when stored in the storage medium. One of such optional forms is a compressed form. Namely, the sound data generating unit 212 may have a function of changing the form of the sound data into a selected one of the compressed form and a non-compressed form. In addition, the necessary information to be contained in the data format of FIG. 20 may also be generated in the sound data generating unit 212.

Figure 31:
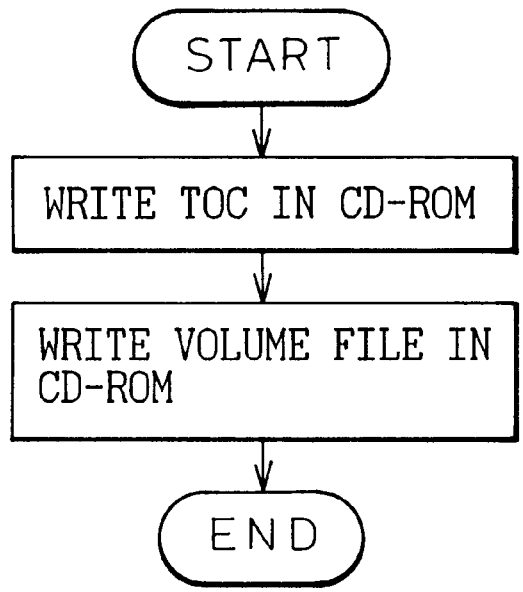
FIG. 31 is a diagram illustrating the operation of the TOC writing unit 213 in FIG. 26.
Figure 32:
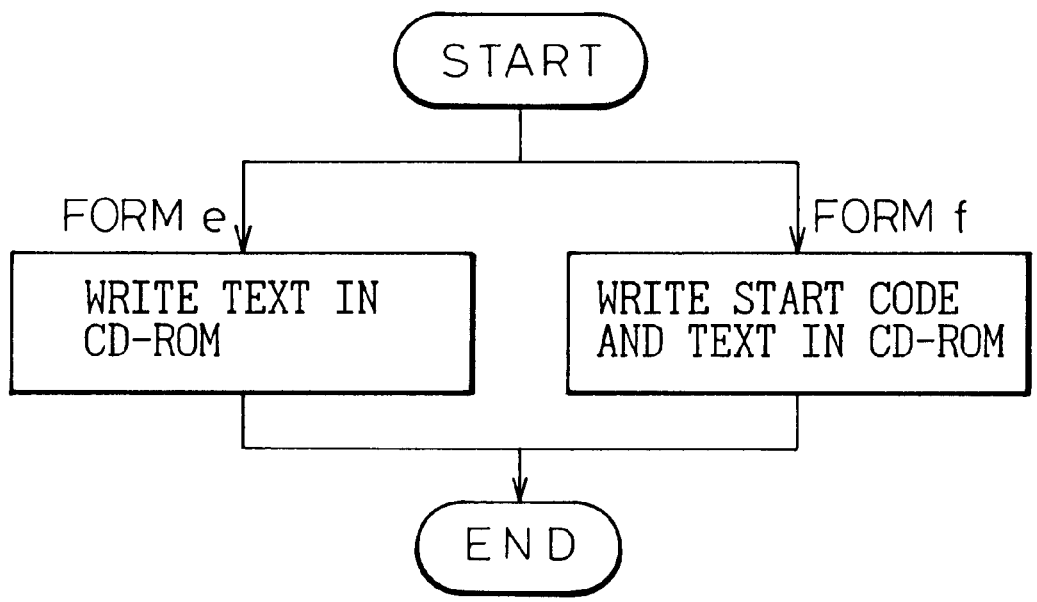
FIG. 32 is a diagram illustrating the operation of the text data writing unit 214 in FIG. 26.

The TOC writing unit 213 generates and writes the table of contents (TOC) and a volume file in the CD-ROM 1a, as indicated in FIG. 31.

The text data writing unit 214 writes, in the CD-ROM 1a, text data which is input through the text input unit 204. The text data writing unit 214 may further contain a program unit for generating the aforementioned information which accompanies the text data according to the present invention, such as the identification information, the pointer information, and the data length information. The text data generating unit 214 does or does not add the identification information (for example, the aforementioned start code) to the text data when writing the text data in the storage medium, depending on which data format is used.

Figure 33:
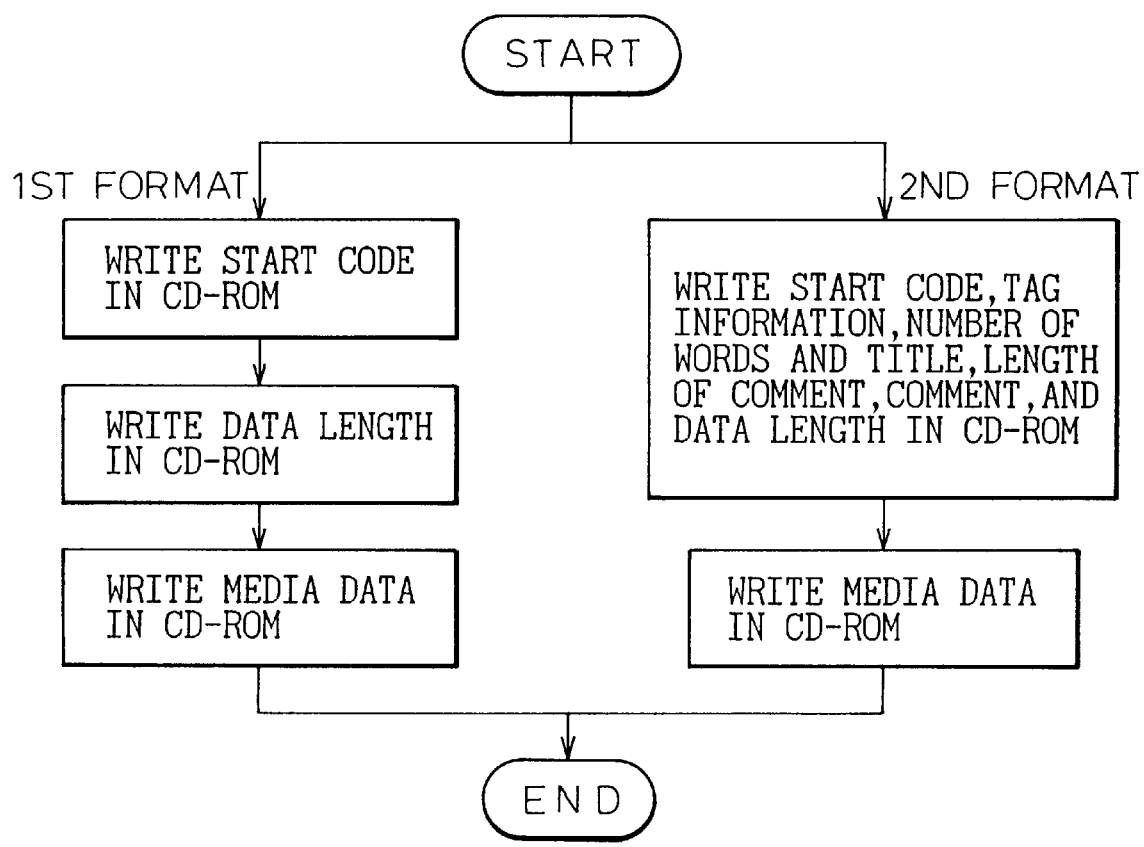
FIG. 33 is a diagram illustrating the operation of the sound/image data writing unit 215 in FIG. 26.

The image/sound data writing unit 215 writes, in the CD-ROM 1a, the image data generated by the image data generating unit 211 and/or the sound data generated by the sound data generating unit 212. FIG. 33 is a diagram illustrating an example of the operation of the sound/image data writing unit 215 in FIG. 26. In the example of FIG. 33, the "first format" means the data format of FIG. 4A, and the "second format" means the data format of FIG. 20. Namely, when the "first format" is used, first the start code is written in the CD-ROM, next the data length information is written, and then the media data (image data or sound data) generated by the image data generating unit 211 or the sound data generating unit 212 is written in the CD-ROM. When the "second format" is used, for example, first, the start code, the tag information, the number of word, the title, the length of the comment, the comment, the data length, and the like are written, and then the media data (image data or sound data) generated by the image data generating unit 211 or the sound data generating unit 212 is written in the CD-ROM.

Figure 34B:
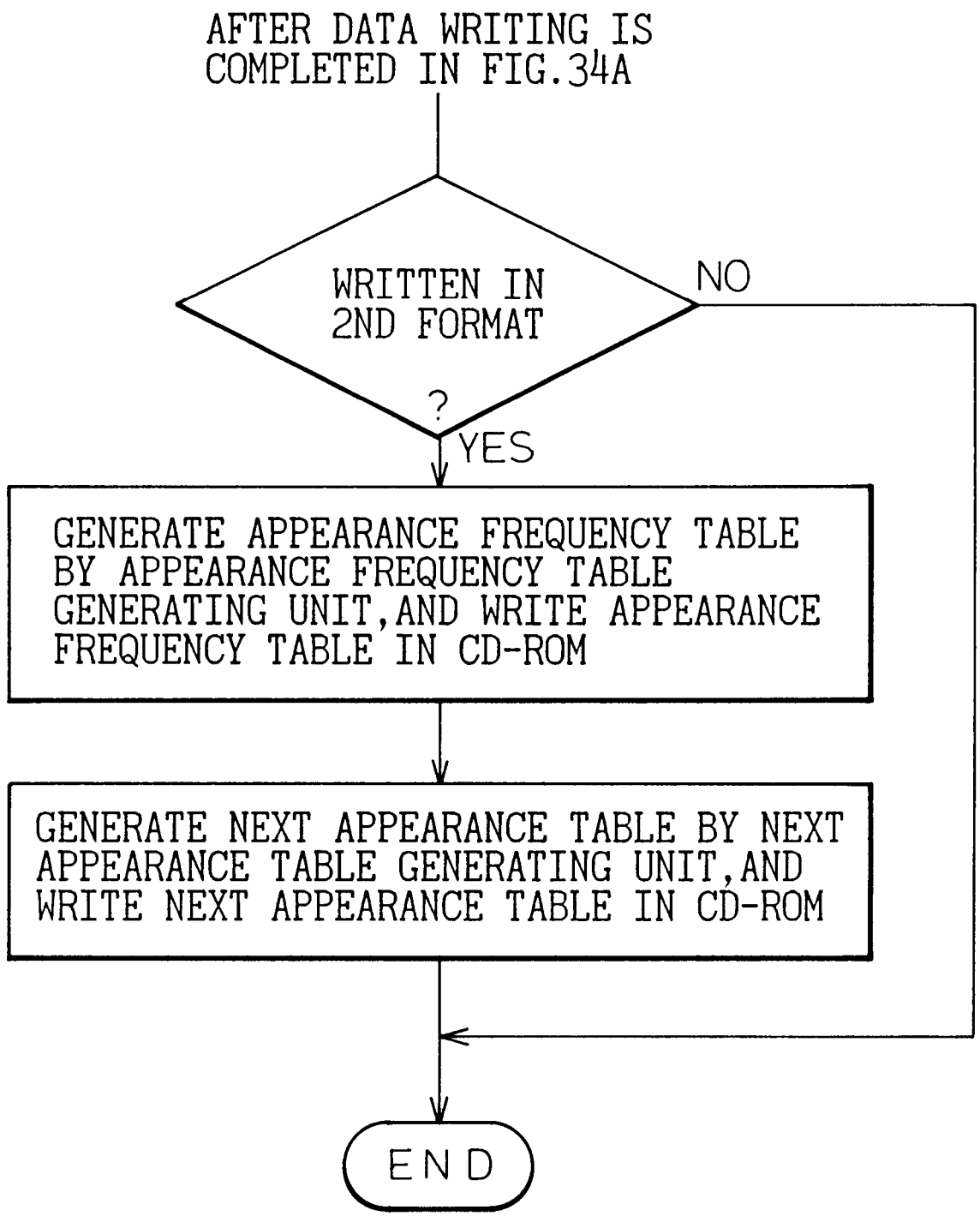

FIGS. 34A and 34B are diagrams illustrating the outline of an example operation of the multimedia data recording apparatus of FIG. 26, which is controlled by the central processing unit 200. As indicated in FIG. 34A, it is determined whether or not the data writing is currently requested or completed, after the table of the contents and the volume file are written by the TOC writing unit 213, and what data is requested to be written, is determined. Then, according to these determinations, the multimedia data recording apparatus operates as follows. When a piece of text data input through the text data input unit 204 is requested to be written, the piece of text data is written in the CD-ROM by the text data writing unit 214. When a piece of sound data is requested to be written, the piece of sound data to be written is generated by the sound data generating unit 212, and then the piece of sound data is written in the CD-ROM by the image/sound data writing unit 215. When a piece of image data is requested to be written, the piece of image data to be written is generated by the image data generating unit 211, and then the piece of image data is written in the CD-ROM by the image/sound data writing unit 215. When a piece of image data together a piece of sound data is requested to be written, the piece of image data to be written is generated by the image data generating unit 211, and the piece of sound data to be written is generated by the sound data generating unit 212. Then, the pieces of sound data and image data are written in the CD-ROM by the image/sound data writing unit 215. According to the present invention, the above pieces of various data can be written in the CD-ROM successively in the order of the occurrences of the requests for writing the respective pieces of data, without a track jump. This successive writing is controlled by the controller 202, which is controlled by the central processing unit 200.

When the data writing is completed, it is determined, as indicated in the first step of FIG. 34B, whether or not the data is written in the above-mentioned second format (the data format of FIG. 20). When yes is determined, the appearance frequency table and the next appearance table are generated by the appearance frequency table generating unit 216 and the next appearance table generating unit 217, respectively, and these tables are written in the CD-ROM. Thus, the operation of FIGS. 34A and 34B is completed. When it is determined, in the first step of FIG. 34B, that the above data is not written in the "second format", the operation of FIGS. 34A and 34B is completed. Although in the example of FIGS. 34A and 34B, the data to be written in the storage medium (CD-ROM) is generated in response to the request for writing the data in the CD-ROM, the data to be written and the other information to be written in the various data formats may be generated in advance and stored in the secondary storage device 207. In this case, the data to be written is read from the secondary storage device 207 in response to the request for writing the data. Then, the data is written in the CD-ROM.

Embodiment of Reproducing Apparatus (FIGS. 35, 10, 14, and 36)

Figure 35:
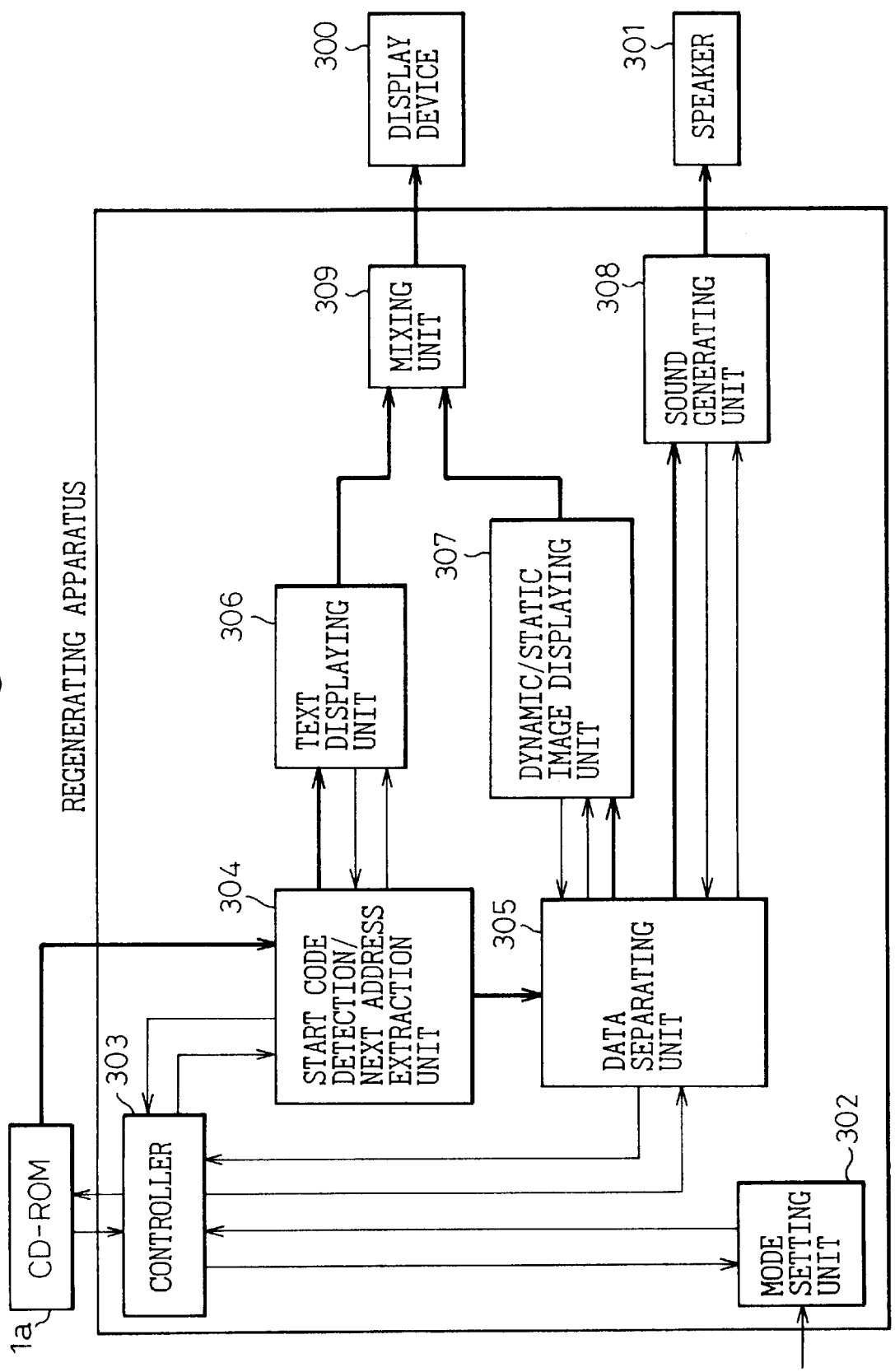
FIG. 35 is a diagram illustrating a multimedia data reproducing apparatus as an embodiment of the reproducing apparatus according to the third or fourth aspect of the present invention.

FIG. 35 is a diagram illustrating a multimedia data reproducing apparatus as an embodiment of the reproducing apparatus according to the third or fourth aspect of the present invention. In FIG. 35, reference numeral 300 denotes a display device, 301 denotes a speaker, 302 denotes a mode setting unit, 303 denotes a controller, 304 denotes a start code detection/next address extraction unit, 305 denotes a data separating unit, 306 denotes a text displaying unit, 307 denotes a dynamic/static image data displaying unit, 308 denotes a sound generating unit, and 309 denotes a mixing unit. The construction of FIG. 35 can realize any of the constructions of FIGS. 6, 7, and 8. In FIG. 35, the bold lines indicate flows of data which may contain control information such as the identification information (e.g., a start code) and the pointer information (e.g., an address of an area on the CD-ROM), and non-bold lines indicate flows of control information.

Although not shown, the CD-ROM 1*a* is inserted into a CD-ROM reading mechanism which is a portion of the multimedia data reproducing apparatus of FIG. 26, and the controller 303 controls the CD-ROM reading mechanism.

The mode setting unit 302 in FIG. 35 may realize the aforementioned various functions of the way-of-reproduction designation unit 34 in FIG. 7 and/or the pointer information selection rule designation unit 36 in FIG. 8. In addition, information on which portion of the data in the CD-ROM is to be reproduced, is input into the mode setting unit 302. Further, other information on data to be reproduced, for example, a portion or all of the header information of FIG. 25, such as information on whether or not the data in the CD-ROM is written in the data format of FIG. 20, may be input through the mode setting unit 302, instead of writing the same on the CD-ROM. Otherwise, the aforementioned inputs of the way-of-production designation unit 34 in FIG. 7 and/or the pointer information selection rule designation unit 36 in FIG. 8 may be written in the top area of the CD-ROM, instead of inputting through the mode setting number 302. Although not shown, the mode setting unit 302 in FIG. 35 may comprise a construction for man-machine interface which enables an operator to input information into the multimedia data reproducing apparatus. For example, the construction for man-machine interface may comprise a keyboard and/or a switch panel.

The controller 303 controls the operations of reading data from the CD-ROM based on the information input through the mode setting unit 302 and the identification information and pointer information detected or extracted by the start code detection/next address extraction unit 304.

The start code detection/next address extraction unit 304 receives the data including the control information from the CD-ROM, detects the start code (i.e., identification information) to determine which type of data follows the start code. When the header information indicates that no identification information accompanies each piece of text data, the start code detection/next address extraction unit 304 detects no start code before a piece of data, the start code detection/next address extraction unit 304 determines that the piece of data is text data. In this case, it is assumed that the end of each piece of the other types of data such as sound data, dynamic image data, or static image data, can be recognized by the data format of each piece, and this is true as for the usual data format of sound data, dynamic image data, and static image data. When the start code detection/next address extraction unit 304 determines that a piece of text data follows, the start code detection/next address extraction unit 304 transfers the piece of text data to the text displaying unit 306. When the start code detection/next address extraction unit 304 determines that a piece of another type of data such as sound data, dynamic image data, or static image data, follows, the start code detection/next address extraction unit 304 transfers the piece of data to the data separating unit 305, together with information which indicates the type of the data. This information may be the above start code per se.

The start code detection/next address extraction unit 304 may also detect the pointer information. When the start code detection/next address extraction unit 304 detects the pointer information, the start code detection/next address extraction unit 304 transfers the pointer information to the controller 303. Receiving the pointer information, the controller 303 recognizes the position of the area in the CD-ROM from which data is to be read next, and reads data therefrom.

Further, when each piece of data is accompanied by the data length information, the start code detection/next address extraction unit 304 utilizes the data length information to separate the respective piece of data.

The function of the pointer information selection control unit 35 in the construction of FIG. 8 may be realized by the controller 303 or the start code detection/next address extraction unit 304. In the former case, all of the plurality of pieces of pointer information which accompany each piece of data are detected by the start code detection/next address extraction unit 304, and are then supplied to the controller 303, and the controller 303 adopts one of the plurality of pieces of pointer information as a piece of pointer information which indicates the position of the area in the CD-ROM from which data is to be read next, based on the pointer information selection rule, which is input through the mode setting unit 302. In the latter case, the start code detection/next address extraction unit 304 adopts one of the plurality of pieces of pointer information as a piece of pointer information which indicates the position of the area in the CD-ROM from which data is to be read next, based on the pointer information selection rule, and supplies the selected one to the controller 303.

The data separating unit 305 receives the data and the above information transferred from the start code detection/next address extraction unit 304, transfers, based on the information, the dynamic image data and the static image data to the dynamic/static image displaying unit 307, and the sound data to the sound generating unit 308, respectively.

The text displaying unit 306 processes the piece of text data transferred from the start code detection/next address extraction unit 304 so that a piece of text represented by the piece of text data can be displayed by the display device 300. For example, the text displaying unit 306 regenerates from the piece of text data a video signal for displaying a text.

The dynamic/static image displaying unit 307 processes the piece of dynamic or static image data transferred from the data separating unit 305 so that a dynamic or static image represented by the piece of dynamic or static image data can be regenerated on the display device 300. For example, the dynamic/static image displaying unit 307 regenerates from the piece of dynamic or static image data a video signal for displaying the dynamic or static image.

The mixing unit 309 synthesizes the processed text data and the processed dynamic or static image data so that the synthesized image can be displayed by the display device 300. For example, the mixing unit 309 synthesizes the above video signals from the text displaying unit 306 and the dynamic/static image displaying unit 307. The processed and synthesized data (video signal) is supplied to the display device 300 to be displayed thereby. Although the path of the control information to the mixing unit 309 is not indicated in FIG. 35, the mixing unit 309 may be controlled by control information which is input through the mode setting unit 302 so that only the dynamic or static image is output to the display device 300 by discarding the text data.

The sound generating unit 308 regenerates a sound signal from the piece of sound data transferred from the separating unit 305. The regenerated sound signal is supplied to the speaker 301 to be output as a sound.

When an instruction to read all types of data stored in the CD-ROM, is input through the mode setting unit 302, the controller 303 controls the CD-ROM reading mechanism to continuously read all types of data stored in the CD-ROM in the order the data are stored in the CD-ROM, and the start code detection/next address extraction unit 304 separates and transfers all types of data to the text displaying unit 306 or the data separating unit 305.

When an instruction to read only specific one or more types of data among the data stored in the CD-ROM, is input through the mode setting unit 302, and a piece of pointer information indicating an address of a piece of data of the specific one or more types which is to be read next, accompanies each piece of data of the specific one or more types, the start code detection/next address extraction unit 304 detects each piece of pointer information indicating an address of a piece of data of the specific one or more types which is to be read next, and transfers the same to the controller 303. Receiving the pointer information, the controller 303 controls CD-ROM reading mechanism to jump to the address indicated by the pointer information and read a piece of data stored in the address of the CD-ROM. The piece of data read from the CD-ROM is transferred through the start code detection/next address extraction unit 304 (and the data separating unit 305 when the data is not text data) to one of the text displaying unit 306, the dynamic/static image displaying unit 307, and the sound generating unit 308. When the above piece of data is also accompanied by a piece of pointer information indicating an address of another piece of data of the specific one or more types which is to be read next, similar operations are repeated.

When an instruction to read only specific one or more types of data among the data stored in the CD-ROM, is input through the mode setting unit 302, and no piece of pointer information indicating an address of a piece of data of the specific one or more types which is to be read next, accompanies each piece of data of the specific one or more types (or another instruction to ignore the pointer information is also input through the mode setting unit 302), the controller 303 controls the CD-ROM reading mechanism to continuously read all types of data stored in the CD-ROM in the order the data are stored in the CD-ROM, and the start code detection/next address extraction unit 304 detects one or more pieces of identification information of the specific one or more types, and separates pieces of data accompanied by the identification information. The piece of data read form the CD-ROM is transferred through the start code detection/next address extraction unit 304 (and the data separating unit 305 when the data is not text data) to one of the text displaying unit 306, the dynamic/static image displaying unit 307, and the sound generating unit 308.

As described above, due to the use of the data formats of FIGS. 2 and 4A to 4G, specific one or more types of data can be read and reproduced in the time sequential order by a simple operation.

Figure 36:
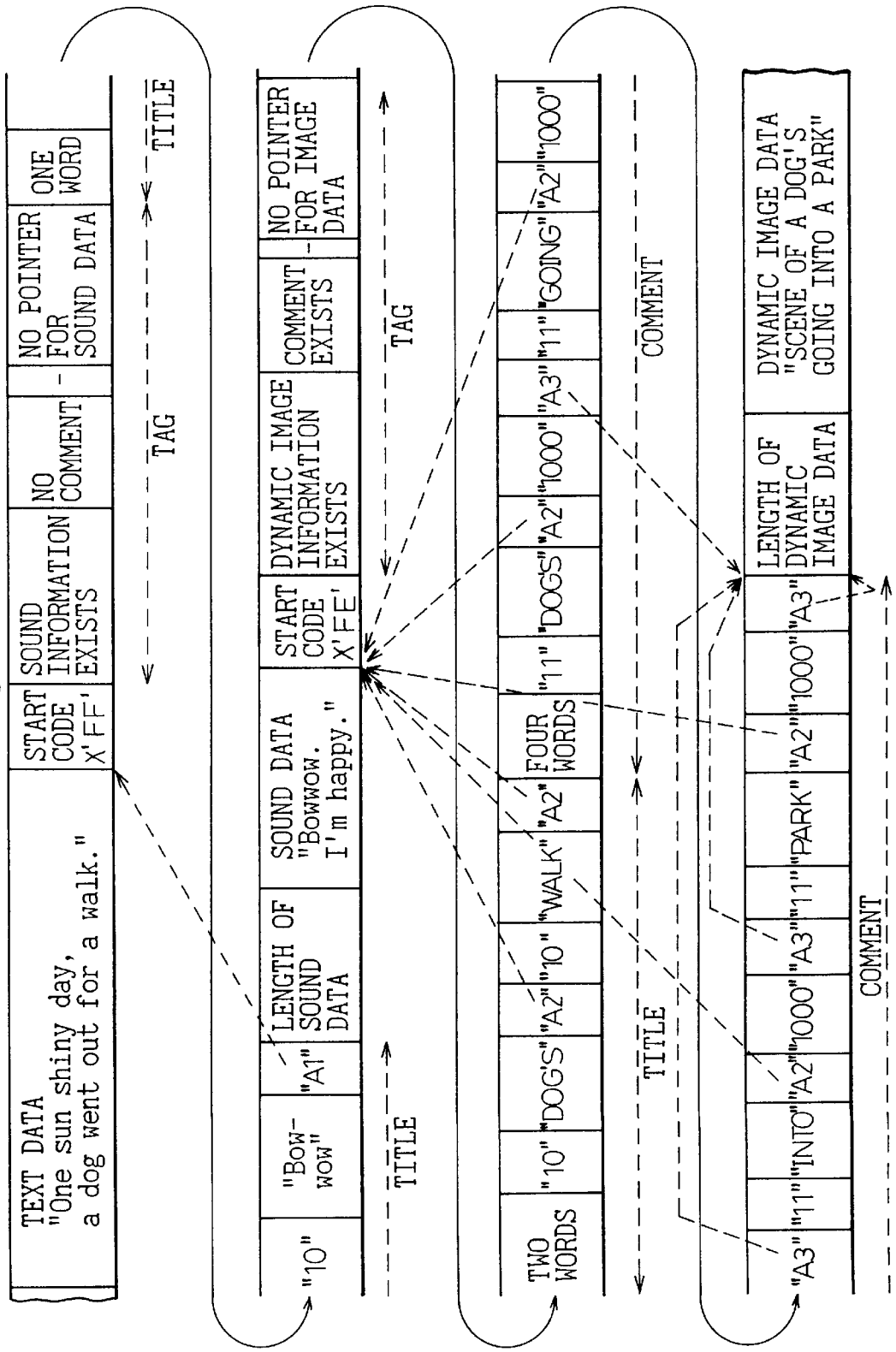
FIG. 36 is a diagram illustrating a concrete example of multimedia data stored in the multimedia data format of FIG. 20, and to be reproduced by the multimedia data reproducing apparatus of FIG. 35.

The operations of the multimedia data reproducing apparatus of FIG. 35 are explained below for the three example cases wherein the data of FIGS. 10, 14, and 36 are read by the multimedia data reproducing apparatus of FIG. 35, respectively.

A first example operation of the multimedia data reproducing apparatus is explained below for the case of reading the data of FIG. 10 in accordance with an instruction to read all types of data stored in the CD-ROM. This instruction can be input through the mode setting unit 302. In addition to the instruction, information on the use of the data format of FIG. 9, should be supplied to the multimedia data reproducing apparatus of FIG. 35. The above information may be supplied through the mode setting unit 302, or by reading the information at the top of the data storage area of the CD-ROM when the information is written thereat.

In response to the above instruction, the controller 303 starts the operations of controlling the CD-ROM reading mechanism to read the data of FIG. 36. The start code detection/next address extraction unit 304 receives and examines the read data, and determines that a piece of text data is received, based on the fact that no start code precede the piece of data. Then, the piece of data is transferred to the text displaying unit 306, and is processed to be displayed by the display device 300. The processed text data is transferred through the mixing unit 309 to the display device 300. Thus, the text "One shiny day, a dog went out for a walk." is displayed by the display device 300.

Next, the start code detection/next address extraction unit 304 detects the start code "X'FF'" (identification information) for sound data, determines that the piece of data following the start code "X'FF'" is sound data, and transfers the piece of data to the data separating unit 305, together with the information which indicates the transferred piece of data is sound data. This information may be the start code "X'FF'" per se. The data separating unit 305 transfers the piece of sound data to the sound generating unit 308. The sound generating unit 308 regenerates a sound signal from the piece of sound data, and transfers the sound signal to the speaker 301. Thus, the speaker 301 outputs the sound, "Bowwow, I'm happy."

Following the above piece of sound data, the start code detection/next address extraction unit 304 detects the start code "X'FE'" (identification information) for dynamic image data, determines that the piece of data following the start code "X'FE'" is dynamic image data, and transfers the piece of data to the data separating unit 305, together with the information which indicates the transferred piece of data is dynamic image data. This information may be the start code "X'FE'" per se. The data separating unit 305 transfers the piece of dynamic image data to the dynamic/static image displaying unit 307. The dynamic/static image displaying unit 307 regenerates a video signal from the piece of dynamic image data, and transfers the video signal to the display device 300. Thus, the display device 300 displays a scene of a dog walking. After the above operations, the following pieces of multimedia data are regenerated in a similar manner.

A second example operation of the multimedia data reproducing apparatus is explained below for the case of reading the data of FIG. 14 in accordance with an instruction to read only sound data stored in the CD-ROM. The instruction and information on the use of the data format (the format of FIG. 13 in the second example), are supplied to the multimedia data reproducing apparatus of FIG. 35 and transferred to the same units in the multimedia data reproducing apparatus, in the same manner as in the above first example operation.

In response to the above instruction, the controller 303 starts the control operations of the CD-ROM reading mechanism to read the data of FIG. 14. The start code detection/ next address extraction unit 304 receives and examines the read data, and searches for the start code "X'FF'" for sound data. When the start code detection/next address extraction unit 304 detects the start code "X'FF'", the piece of data following the start code is separated and transferred to the data separating unit 305, together with the information which indicates the transferred piece of data is sound data. This information may be the start code "X'FF'" per se. The data separating unit 305 transfers the piece of sound data to the sound generating unit 308. The sound generating unit 308 regenerates a sound signal from the piece of sound data, and transfers the sound signal to the speaker 301. Thus, the speaker 301 outputs the sound, "Bowwow, I'm happy."

Following the above piece of sound data, the start code detection/next address extraction unit 304 detects a piece PTS1 of pointer information which indicates an address of another piece of sound data which is to be read next, among the plurality of pieces of pointer information PTS1, PTM1, and PTI1, and transfers the detected address information to the controller 303. Receiving the address information, the controller 303 controls the CD-ROM reading mechanism to jump to the address and read data beginning from the address. The start code detection/next address extraction unit 304 receives and examines the above data, and searches for the start code "X'FF'" for sound data. When the start code detection/next address extraction unit 304 detects the start code "X'FF'", the piece of data following the start code is separated and transferred to the data separating unit 305, together with the information which indicates the transferred piece of data is sound data. This information may be the start code "X'FF'" per se. The data separating unit 305 transfers the piece of sound data to the sound generating unit 308. The sound generating unit 308 regenerates a sound signal from the piece of sound data, and transfers the sound signal to the speaker 301. Thus, the speaker 301 outputs again the sound, "Bowwow, I'm happy." Then, the start code detection/next address extraction unit 304 detects a piece PTS2 of pointer information which indicates an address of another piece of sound data which is to be read next, among the plurality of pieces of pointer information PTS2, PTM2, and PTI2, and transfers the detected address information to the controller 303. After the above operations, the following pieces of sound data are regenerated in a similar manner.

FIG. 36 is a diagram illustrating a concrete example of multimedia data stored in the data format of FIG. 20, and to be reproduced by the multimedia data reproducing apparatus of FIG. 35.

A third example operation of the multimedia data reproducing apparatus is explained below for the case of reading the data of FIG. 36 in accordance with an instruction to read only sound data and dynamic image data stored in the CD-ROM. The instruction can be input through the mode setting unit 302. The instruction and information on the use of the data format (the format of FIG. 20 in the third example), are supplied to the multimedia data reproducing apparatus of FIG. 35 and transferred to the same units in the multimedia data reproducing apparatus, in the same manner as in the above first example operation. Although not shown in FIG. 36, the above information on the use of the data format of FIG. 20 can be written in the header information as explained with reference to FIG. 25.

In response to the above instruction, the controller 303 starts the operations of controlling the CD-ROM reading mechanism to read the data of FIG. 36. In accordance with the above instruction, the start code detection/next address extraction unit 304 receives the data and tries to find the start codes "X'FF'" and "X'FE'" for the sound data and the dynamic image data. Since the start code "X'FF'" appears first in the example of FIG. 36, the start code detection/next address extraction unit 304 first detects the start code "X'FF'" and then the tag information which is explained with reference to FIG. 20. In this example, this tag information indicates that this piece contains sound data, no comment, and the real data is contained in the format of FIG. 20. Then, the start code detection/next address extraction unit 304 separates the real sound data portion which follows the tag information and the title portion, from the other portions, and transfers the real sound data portion, to the data separating unit 305, together with the information which indicates the transferred piece of data is sound data. This information may be the start code "X'FF'" per se. The data separating unit 305 transfers the piece of sound data to the sound generating unit 308. The sound generating unit 308 regenerates a sound signal from the piece of sound data, and transfers the sound signal to the speaker 301. Thus, the speaker 301 outputs the sound, "Bowwow, I'm happy."

Following the above piece of sound data, the start code detection/next address extraction unit 304 continues to receive the read data and tries to detect the start codes "X'FF'" and "X'FE'" for the sound data and dynamic image data. In the example of FIG. 36, a piece of dynamic image data follows the above piece of sound data. Therefore, the start code detection/next address extraction unit 304 next detects the start code "X'FE'" and then the tag information. This tag information indicates that this piece contains dynamic image data, a comment, and the real data in the format of FIG. 20. Then, the start code detection/next address extraction unit 304 separates the real dynamic image data portion which follows the tag information, the title portion, and the comment portion, from the other portions, and transfers the real dynamic image data portion, to the data separating unit 305, together with the information which indicates the transferred dynamic image data portion is dynamic image data. This information may be the start code "X'FE'" per se. The data separating unit 305 transfers the piece of dynamic image data to the dynamic/static image displaying unit 307. The dynamic/static image displaying unit 307 regenerates a video signal from the real dynamic image data portion, and transfers the video signal to the display device 300. Thus, the display device 300 displays a scene in which a dog is going into a park.

I claim:

1. A storage medium storing:
   a plurality of pieces of data stored in said storage medium in a sequential order in which the plurality of pieces of data are to be reproduced, said pieces of data to be reproduced in a plurality of reproduction modes and said sequential order being independent of said plurality of reproduction modes; and
   identification information accompanying at least one of the pieces of data and indicating a respective at least one reproduction mode included in the plurality of reproduction modes and in which the at least one piece of data is to be reproduced.

2. A storage medium according to claim 1, wherein each of the pieces of data to be reproduced in a predetermined one of the plurality of reproduction modes is not accompanied by said identification information, whereby an absence of identification information accompanying a piece of data indicates the predetermined reproduction mode.

3. A storage medium according to claim 1, further comprising pointer information accompanying each of at least one of the plurality of pieces of data, said pointer information indicating a location at which a next piece of data, included in said plurality of pieces of data and to be reproduced next to said each of at least one of the plurality of pieces of data, is stored in said storage medium.

4. A storage medium according to claim 3, wherein for each piece of data accompanied by said pointer information, the next piece of data and the pointer-accompanied piece of data are to be reproduced in a same one of the plurality of reproduction modes.

5. A storage medium according to claim 1, wherein each of at least one plurality of pieces of data stored in the storage medium is further accompanied by a plurality of pieces of pointer information which indicate a plurality of locations in which a plurality of candidates for a next piece of data included in said plurality of pieces of data which is to be reproduced next to said each of at least one of the plurality of pieces of data, are stored in said storage medium.

6. A storage medium according to claim 5, wherein each of said plurality of candidates includes pieces of data to be reproduced respectively in different reproduction modes.

7. A storage medium according to claim 1, further comprising data length information accompanying at least one of the plurality of pieces of data, said data length information indicating a length of each of the at least one piece of data accompanied by said data length information.

8. A recording apparatus, comprising:
   a data generating unit that generates a plurality of pieces of data to be recorded on a storage medium and to be reproduced in a plurality of reproduction modes;
   an identification information generating unit that generates, for at least one of said plurality of pieces of data, identification information indicating one of the plurality of reproduction modes in which said each of the at least one of the plurality of pieces of data is to be reproduced; and
   a data writing unit that sequentially writes in the storage medium the plurality of pieces of data and the identification information respectively generated therefor, to store the plurality of pieces of data in a sequential order in which the plurality of pieces of data are to be reproduced, the sequential order being independent of the plurality of reproduction modes, and each of the plurality of pieces of data for which identification information is generated being accompanied by the identification information generated therefor.

9. A recording apparatus according to claim 8, wherein said identification information generating unit does not generate identification information for any of the plurality of pieces of data to be reproduced in a predetermined one of the plurality of reproduction modes; and
   said data writing unit writes each of the plurality of pieces of data to be reproduced in the predetermined reproduction mode without writing identification information to accompany the piece of data.

10. A recording apparatus according to claim 8, further comprising a pointer information generating unit that generates pointer information for each of at least one of said plurality of pieces of data, the pointer information indicating a location at which a next piece of data, included in the plurality of pieces of data and to be reproduced next, is to be stored in the storage medium, said data writing unit further writing the pointer information in the storage medium to accompany the piece of data by the pointer information generated therefor.

11. A recording apparatus according to claim 10, wherein for each piece of data for which pointer information is generated, the next piece of data and the pointer-accompanied piece of data are to be reproduced in a same one of the plurality of reproduction modes.

12. A recording apparatus according to claim 8, further comprising a pointer information generating unit for generating, for each of at least one of said plurality of pieces of data, a plurality of pieces of pointer information indicating a plurality of locations at which a plurality of candidates for a next piece of data included in said plurality of pieces of data, which is to be reproduced next to said each of at least one of said plurality of pieces of data, are stored in said storage medium;
   and wherein said data writing unit further writes said plurality of pieces of pointer information in the storage medium to accompany the piece of data for which the plurality of pieces of pointer information are generated.

13. A recording apparatus according to claim 12, wherein each of the plurality of candidates includes pieces of data to be reproduced respectively in different reproduction modes.

14. A recording apparatus according to claim 8, further comprising a data length information generating unit that generates data length information for each of at least one of the plurality of pieces of data, the data length information indicating a length of the piece of data, said data writing unit further writing the data length information in the storage medium to accompany the piece of data by the data length information generated therefor.

15. A reproducing apparatus comprising:
   a data reading unit that reads a plurality of pieces of data stored in a storage medium in a sequential order independent of a plurality of modes for reproducing the pieces of data;
   an identification information detecting unit that detects identification information accompanying at least one of the pieces of data, the identification information indicating a respective at least one reproduction mode included in the plurality of reproduction modes and in which the at least one piece of data is to be reproduced; and
   a reproducing unit that sequentially reproduces the plurality of pieces of data according to the identification information detected by said identification information detecting unit;
   wherein each of the pieces of data to be reproduced in a predetermined one of the plurality of reproduction modes is not accompanied by the identification information, whereby an absence of identification information accompanying a piece of data indicates the predetermined reproduction mode; and
   said reproducing unit reproduces a piece of data in the predetermined reproduction mode when said identification information detecting unit detects that no identification information accompanies the piece of data.

16. A reproducing apparatus for reproducing a plurality of pieces of data stored in a storage medium, where the plurality of pieces of data are to be reproduced in a plurality of reproduction modes and are stored in the storage medium in a sequential order in which the plurality of pieces of data are to be reproduced, the sequential order being independent of the plurality of reproduction modes in which the plurality of pieces of data are to be reproduced, each of the plurality of pieces of data stored in the storage medium being accompanied by identification information indicating one of the plurality of reproduction modes in which the piece of data is to be reproduced, said reproducing apparatus comprising:
   a data reading unit for reading contents stored in the storage medium in sequential order, said data reading unit reading pointer information when the pointer information accompanies a piece of data included in the plurality of pieces of data stored in the storage medium, and tracing and reading at least a portion of each one of at least one of the plurality of pieces of data based on pointer information accompanying the piece of data which has been read by the data reading unit just before the each one of the at least one of the plurality of pieces of data, the pointer information indicating a location in the storage medium at which a next piece of data, included in the plurality of pieces of data and to be reproduced next, is stored;

an identification information detecting unit for detecting the identification information accompanying the respective pieces of data stored in the storage medium; and a reproducing unit for sequentially reproducing the plurality of pieces of data in the corresponding reproduction modes indicated by the identification information detected by said identification information detecting unit accompanying the respective pieces of information stored in the storage medium.

17. A reproducing apparatus according to claim 16, wherein for each piece of data accompanied by pointer information, the next piece of data and the pointer-accompanied piece of data are to be reproduced in a same one of the plurality of reproduction modes.

18. A reproducing apparatus for reproducing a plurality of pieces of data stored in a storage medium, where the plurality of pieces of data are to be reproduced in a plurality of reproduction modes and are stored in the storage medium in a sequential order in which the plurality of pieces of data are to be reproduced, the sequential order being independent of the plurality of reproduction modes in which the plurality of pieces of data are to be reproduced, each of the plurality of pieces of data stored in the storage medium being accompanied by identification information indicating one of the plurality of reproduction modes in which the piece of data is to be reproduced, said reproducing apparatus comprising:

a data reading unit for reading contents stored in the storage medium in sequential order, said data reading unit reading a selected one of a plurality of pieces of pointer information when the plurality of pieces of pointer information accompany a piece of data included in the plurality of pieces of data stored in the storage medium, and tracing and reading another piece of data included in the plurality of pieces of data based on the selected one of the plurality of pieces of pointer information, the plurality of pieces of pointer information indicating a plurality of locations in the storage medium for storage of a plurality of candidates for a next piece of data included in the plurality of pieces of data and to be reproduced next to the piece of data accompanied by the plurality of pieces of pointer information;

an identification information detecting unit for detecting the identification information accompanying the respective pieces of data stored in the storage medium; and a reproducing unit for sequentially reproducing the plurality of pieces of data in the corresponding reproduction modes indicated by the identification information detected by said identification information detecting unit and accompanying the respective pieces of information stored in the storage medium.

19. A reproducing apparatus according to claim 18, further comprising a pointer information selection control unit that, for each piece of data accompanied by pointer information, and based on a selection rule, selects as the selected piece of pointer information one of the plurality of pieces of pointer information accompanying the piece of data.

20. A reproducing apparatus according to claim 19, further comprising a pointer information selection rule designating unit for inputting a designation input which designates the selection rule.

21. A reproducing apparatus according to claim 19, wherein the selection rule is to select from a plurality of pieces of pointer information a piece of pointer information read first.

22. A reproducing apparatus according to claim 19, wherein the selection rule is to select, from a plurality of pieces of pointer information which accompany each of said at least one of the plurality of pieces of data, a piece of pointer information indicating a nearest location.

23. A reproducing apparatus according to claim 18, wherein the plurality of candidates are pieces of data to be reproduced respectively in different reproduction modes.

24. A reproducing apparatus for reproducing a plurality of pieces of data stored in a storage medium, the plurality of pieces of data being stored in a storage medium in a sequential order and to be reproduced in the sequential order in a plurality of modes of reproduction, the sequential order being independent of the plurality of reproduction modes, the plurality of pieces of data stored in the storage medium being accompanied by identification information indicating respective ones of the plurality of reproduction modes in which the plurality of pieces of data are to be reproduced, said reproducing apparatus comprising:

a reproduction mode designating unit that inputs designation information designating one or more of the plurality of reproduction modes, thereby indicating reproduction of only pieces of data indicated to be reproduced in the designated one or more reproduction modes;

a data reading unit that reads a piece of data only when the piece of data is to be reproduced in one of the designated one or more reproduction modes; and a reproducing unit that reproduces a piece of data read by the data reading unit;

wherein each of the pieces of data to be reproduced in a predetermined one of the plurality of reproduction modes is accompanied on the storage medium by no identification information, whereby an absence of identification information accompanying a piece of data in the storage medium indicates that the piece of data is to be reproduced in the predetermined reproduction mode; and when the designation information designates only the predetermined reproduction mode, said data reading unit reads a piece of data only when no identification information accompanies the piece of data.

25. A reproducing apparatus for reproducing a plurality of pieces of data stored in a storage medium, the plurality of pieces of data being stored in a storage medium in a sequential order and to be reproduced in the sequential order in a plurality of modes of reproduction, the sequential order being independent of the plurality of reproduction modes, the plurality of pieces of data stored in the storage medium being accompanied by identification information indicating respective ones of the plurality of reproduction modes in which the plurality of pieces of data are to be reproduced, said reproducing apparatus comprising:

a reproduction mode designating unit that inputs designation information designating one or more of the plurality of reproduction modes, thereby indicating reproduction of only pieces of data indicated to be reproduced in the designated one or more reproduction modes;

a data reading unit that reads a piece of data only when the piece of data is to be reproduced in one of the designated one or more reproduction modes; and a reproducing unit that reproduces a piece of data read by the data reading unit;

wherein pointer information accompanies each of at least one of the plurality of pieces of data stored in the storage medium, the pointer information indicating a location at which a next piece of data, included in the plurality of pieces of data and to be reproduced next, is stored in the storage medium; and said data reading unit further reads pointer information when the pointer information accompanies a piece of data included in the plurality of pieces of data stored in the storage medium, and traces and reads the next piece of data based on the pointer information.

26. A reproducing apparatus according to claim 25, wherein for each piece of data accompanied by pointer information, the next piece of data and the pointer-accompanied piece of data are to be reproduced in a same one of the plurality of reproduction modes.

* * * * *